United States Patent
Owoeye

(10) Patent No.: US 12,394,804 B2
(45) Date of Patent: Aug. 19, 2025

(54) THERMAL MANAGEMENT OF A FUEL CELL ASSEMBLY

(71) Applicant: General Electric Company, Schenectady, NY (US)

(72) Inventor: Eyitayo James Owoeye, Houston, TX (US)

(73) Assignee: General Electric Company, Evendale, OH (US)

( * ) Notice: Subject to any disclaimer, the term of this patent is extended or adjusted under 35 U.S.C. 154(b) by 424 days.

(21) Appl. No.: 17/889,020

(22) Filed: Aug. 16, 2022

(65) Prior Publication Data
US 2024/0063403 A1  Feb. 22, 2024

(51) Int. Cl.
| | |
|---|---|
| H01M 8/0247 | (2016.01) |
| H01M 8/0258 | (2016.01) |
| H01M 8/0267 | (2016.01) |
| H01M 8/04014 | (2016.01) |
| H01M 8/04111 | (2016.01) |
| H01M 8/2483 | (2016.01) |

(52) U.S. Cl.
CPC ....... *H01M 8/0258* (2013.01); *H01M 8/0247* (2013.01); *H01M 8/0267* (2013.01); *H01M 8/04022* (2013.01); *H01M 8/04111* (2013.01); *H01M 8/2483* (2016.02)

(58) Field of Classification Search
CPC . H01M 8/0247; H01M 8/0258; H01M 8/0267
See application file for complete search history.

(56) References Cited

U.S. PATENT DOCUMENTS

| | | | |
|---|---|---|---|
| 4,922,113 | A | 5/1990 | Melancon |
| 7,374,821 | B2 | 5/2008 | Leclercq et al. |
| 7,858,952 | B2 | 12/2010 | Feist et al. |
| 8,173,206 | B2 | 5/2012 | Boutwell et al. |
| 8,334,062 | B1 | 12/2012 | Pujari et al. |
| 8,623,526 | B2 | 1/2014 | Liu et al. |
| 8,940,417 | B2 | 1/2015 | Courcot et al. |

(Continued)

FOREIGN PATENT DOCUMENTS

| | | |
|---|---|---|
| CN | 104493114 A | 4/2015 |
| CN | 106917093 A | 7/2017 |

(Continued)

OTHER PUBLICATIONS

Deardorff, Shining a Black Light on Coating Inspections, Photonics Media, Nov. 2010, 6 Pages. Retrieved from: https://www.photonics.com/Articles/Shining_a_Black_Light_on_Coating_Inspections/a44940.

*Primary Examiner* — Kevin E Yoon
(74) *Attorney, Agent, or Firm* — Dority & Manning, P.A.

(57) ABSTRACT

A fuel cell assembly includes a plurality of fuel cells. The fuel cell includes a bipolar separator plate disposed between each fuel cell of the plurality of fuel cells. The bipolar separator plate includes one or more fuel cell sub-units each comprising a plurality of unit-cells. Each unit-cell in the plurality of unit-cells has an outer surface and defines an internal volume that extends in multiple directions between a plurality of openings defined on the outer surface. Each unit-cell in the plurality of unit-cells is disposed adjacent to a neighboring unit-cell in the plurality of unit-cells such that the plurality of unit-cells collectively define one or more channels.

12 Claims, 12 Drawing Sheets

(56) References Cited

U.S. PATENT DOCUMENTS

| | | |
|---|---|---|
| 9,926,238 B2 | 3/2018 | Louchet et al. |
| 10,022,921 B2 | 7/2018 | Kittleson et al. |
| 10,201,831 B2 | 2/2019 | Sivaramakrishnan et al. |
| 10,209,009 B2 | 2/2019 | Gerstler et al. |
| 10,570,746 B2 | 2/2020 | Mongillo et al. |
| 10,641,720 B2 | 5/2020 | Ellis et al. |
| 10,739,077 B2 | 8/2020 | Gerstler et al. |
| 10,829,650 B2 | 11/2020 | Niday et al. |
| 11,046,412 B2 | 6/2021 | Melo |
| 11,078,798 B2 | 8/2021 | Kirby |
| 11,276,869 B2 | 3/2022 | Blanco et al. |
| 2003/0215695 A1* | 11/2003 | Suzuki ............ H01M 8/026 429/434 |
| 2004/0157100 A1 | 8/2004 | Mizuno |
| 2006/0010866 A1 | 1/2006 | Rehg et al. |
| 2006/0127723 A1 | 6/2006 | Rehg et al. |
| 2006/0240308 A1* | 10/2006 | Formanski ....... H01M 8/0265 429/514 |
| 2008/0026248 A1 | 1/2008 | Balagopal et al. |
| 2015/0175486 A1 | 6/2015 | Roberts et al. |
| 2016/0208371 A1 | 7/2016 | Wang et al. |
| 2016/0305034 A1 | 10/2016 | Baque et al. |
| 2017/0183508 A1 | 6/2017 | Wang et al. |
| 2019/0077692 A1 | 3/2019 | Saha et al. |
| 2019/0107499 A1 | 4/2019 | Ellis et al. |
| 2019/0119172 A1 | 4/2019 | Kurimura et al. |
| 2019/0119803 A1 | 4/2019 | Tang et al. |
| 2020/0338639 A1 | 10/2020 | Friesth |
| 2021/0162624 A1 | 6/2021 | Ding |
| 2021/0395535 A1 | 12/2021 | Morra et al. |

FOREIGN PATENT DOCUMENTS

| | | |
|---|---|---|
| CN | 108018516 A | 5/2018 |
| CN | 108018517 A | 5/2018 |
| CN | 108018518 A | 5/2018 |
| WO | WO2015144269 A1 | 10/2015 |

\* cited by examiner

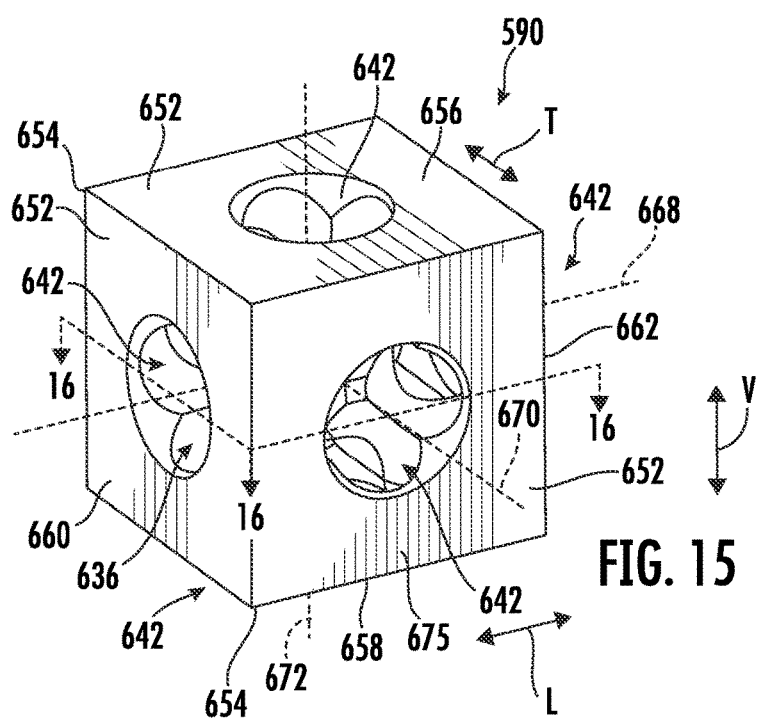

THERMAL MANAGEMENT OF A FUEL CELL ASSEMBLY

FIELD

The present disclosure relates to the thermal management of a fuel cell assembly.

BACKGROUND

A gas turbine engine generally includes a turbomachine and a rotor assembly. Gas turbine engines, such as turbofan engines, may be used for aircraft propulsion. In the case of a turbofan engine, the turbomachine includes a compressor section, a combustion section, and a turbine section in serial flow order, and the rotor assembly is configured as a fan assembly.

During operation, air is compressed in the compressor and mixed with fuel and ignited in the combustion section for generating combustion gases which flow downstream through the turbine section. The turbine section extracts energy therefrom for rotating the compressor section and fan assembly to power the gas turbine engine and propel an aircraft incorporating such a gas turbine engine in flight.

At least certain gas turbine engines include a fuel cell assembly operable therewith.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 15 illustrates a perspective view of a unit-cell of the plurality of unit-cells that collectively make up the coolant cell sub-unit of the bipolar separator plate shown in FIGS. 13 and 14 in accordance with an exemplary aspect of the present disclosure.

FIG. 16 illustrates a cross-sectional perspective view of the unit-cell shown in FIG. 15 from along the line 16-16 in accordance with an exemplary aspect of the present disclosure.

FIG. 17 illustrates a unit-cell of the plurality of unit-cells that collectively make up an electrode cell sub-unit shown in FIG. 14 in accordance with an exemplary aspect of the present disclosure.

DETAILED DESCRIPTION

Figure 1:
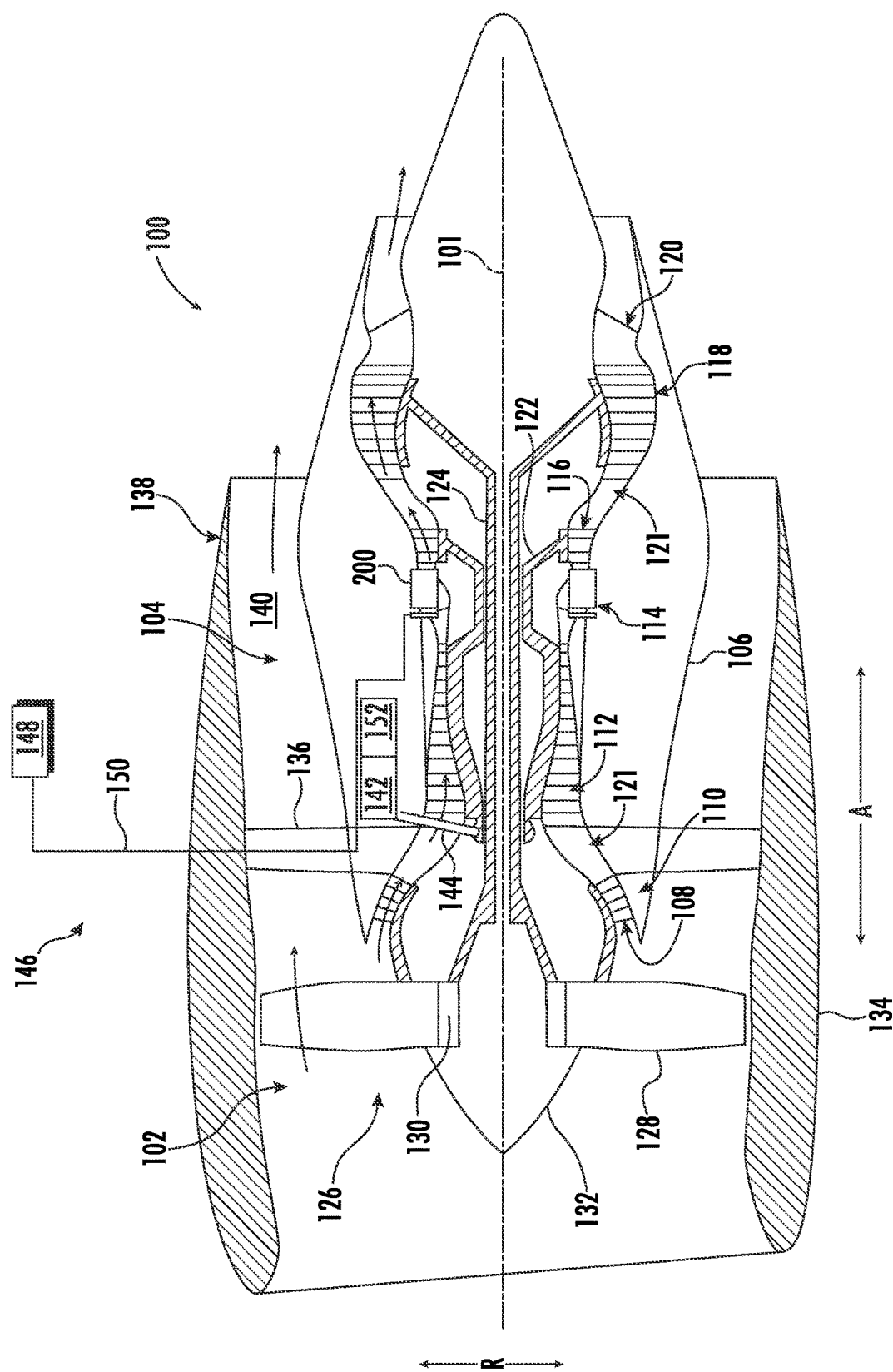
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

As used herein, the term "line" may include a hose, pipe, or other fluid conduit that carries a fluid.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein "unit-cell" is a singular cell, which may be positioned adjacent to other unit-cells to collectively define a cell sub-unit. For example, a "cell sub-unit" may be a collection of unit-cells in contact, and in fluid communication, with one another.

A fuel cell assembly and a propulsion system are provided. The fuel cell assembly includes a plurality of fuel cells each having an anode, a cathode, and a solid electrolyte disposed between the anode and the cathode. The fuel cell assembly includes a bipolar separator plate that is disposed between each fuel cell of the plurality of fuel cells. The bipolar separator plate includes one or more fuel cell sub-units that each comprise a plurality of unit-cells. The plurality of unit-cells each define an interior volume and are be disposed adjacent to one another, such that the interior volume of the plurality of unit-cells collectively define one or more channels. The one or more channels may each receive a fluid for use in, or for the thermal management of, the fuel cell. For example, the one or more channels may include an oxidant channel for the cathode, a fuel channel for the anode, and a coolant channel disposed between the oxidant channel and the fuel channel for collection of heat from the fuel cell.

The fuel cell assembly of the present disclosure advantageously includes single-fluid (i.e., fluidly isolated) fuel cell sub-units that define the fuel, coolant, and oxygen channels in the bipolar separator plate and end plate. Each of the fuel cell sub-units include a plurality of single-fluid unit-cells that enable multidirectional flow at each channel to achieve better thermal distribution. To control the temperature of the fuel cell assembly, the coolant channel may be disposed in fluid communication on a dedicated coolant loop, which may use a coolant (e.g. supercritical $CO_2$, water, and air) as the working fluid. The bipolar separator plate may be integrally formed, e.g., manufactured as a single-material component to further reduces thermal stress across the fuel cell assembly.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass gas turbine engine 100. As shown in FIG. 1, the gas turbine engine 100 defines an axial direction A (extending parallel to a centerline axis 101 provided for reference), a radial direction R, and a circumferential direction (extending about the axial direction A; not depicted in FIG. 1). In general, the gas turbine engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the centerline axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

In such a manner, it will be appreciated that gas turbine engine 100 generally includes a first stream (e.g., core air flowpath 121) and a second stream (e.g., bypass airflow passage 140) extending parallel to the first stream. In certain exemplary embodiments, the gas turbine engine 100 may further define a third stream extending, e.g., from the LP compressor 110 to the bypass airflow passage 140 or to ambient. With such a configuration, the LP compressor 110 may generally include a first compressor stage configured as a ducted mid-fan and downstream compressor stages. An inlet to the third stream may be positioned between the first compressor stage and the downstream compressor stages.

Referring still to FIG. 1, the gas turbine engine 100 additionally includes an accessory gearbox 142 and a fuel delivery system 146. For the embodiment shown, the accessory gearbox 142 is located within the cowling/outer casing 106 of the turbomachine 104. Additionally, it will be appreciated that for the embodiment depicted schematically in FIG. 1, the accessory gearbox 142 is mechanically coupled to, and rotatable with, one or more shafts or spools of the turbomachine 104. For example, in the exemplary embodiment depicted, the accessory gearbox 142 is mechanically coupled to, and rotatable with, the HP shaft 122 through a suitable geartrain 144. The accessory gearbox 142 may provide power to one or more suitable accessory systems of the gas turbine engine 100 during at least certain operations, and may further provide power back to the gas turbine engine 100 during other operations. For example, the accessory gearbox 142 is, for the embodiment depicted, coupled to a starter motor/generator 152. The starter motor/generator may be configured to extract power from the accessory gearbox 142 and gas turbine engine 100 during certain operation to generate electrical power, and may provide power back to the accessory gearbox 142 and gas turbine engine 100 (e.g., to the HP shaft 122) during other operations to add mechanical work back to the gas turbine engine 100 (e.g., for starting the gas turbine engine 100).

Moreover, the fuel delivery system 146 generally includes a fuel source 148, such as a fuel tank, and one or more fuel delivery lines 150. The one or more fuel delivery lines 150 provide a fuel flow through the fuel delivery system 146 to the combustion section 114 of the turbomachine 104 of the gas turbine engine 100. As will be discussed in more detail below, the combustion section 114 includes an integrated fuel cell and combustor assembly 200. The one or more fuel delivery lines 150, for the embodiment depicted, provide a flow of fuel to the integrated fuel cell and combustor assembly 200.

It will be appreciated, however, that the exemplary gas turbine engine 100 depicted in FIG. 1 is provided by way of example only. In other exemplary embodiments, any other suitable gas turbine engine may be utilized with aspects of the present disclosure. For example, in other embodiments, the turbofan engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Moreover, although the exemplary gas turbine engine 100 includes a ducted fan 126, in other exemplary aspects, the gas turbine engine 100 may include an unducted fan 126 (or open rotor fan), without the nacelle 134. Further, although not depicted herein, in other embodiments the gas turbine engine may be any other suitable type of gas turbine engine, such as a nautical gas turbine engine.

Figure 2:
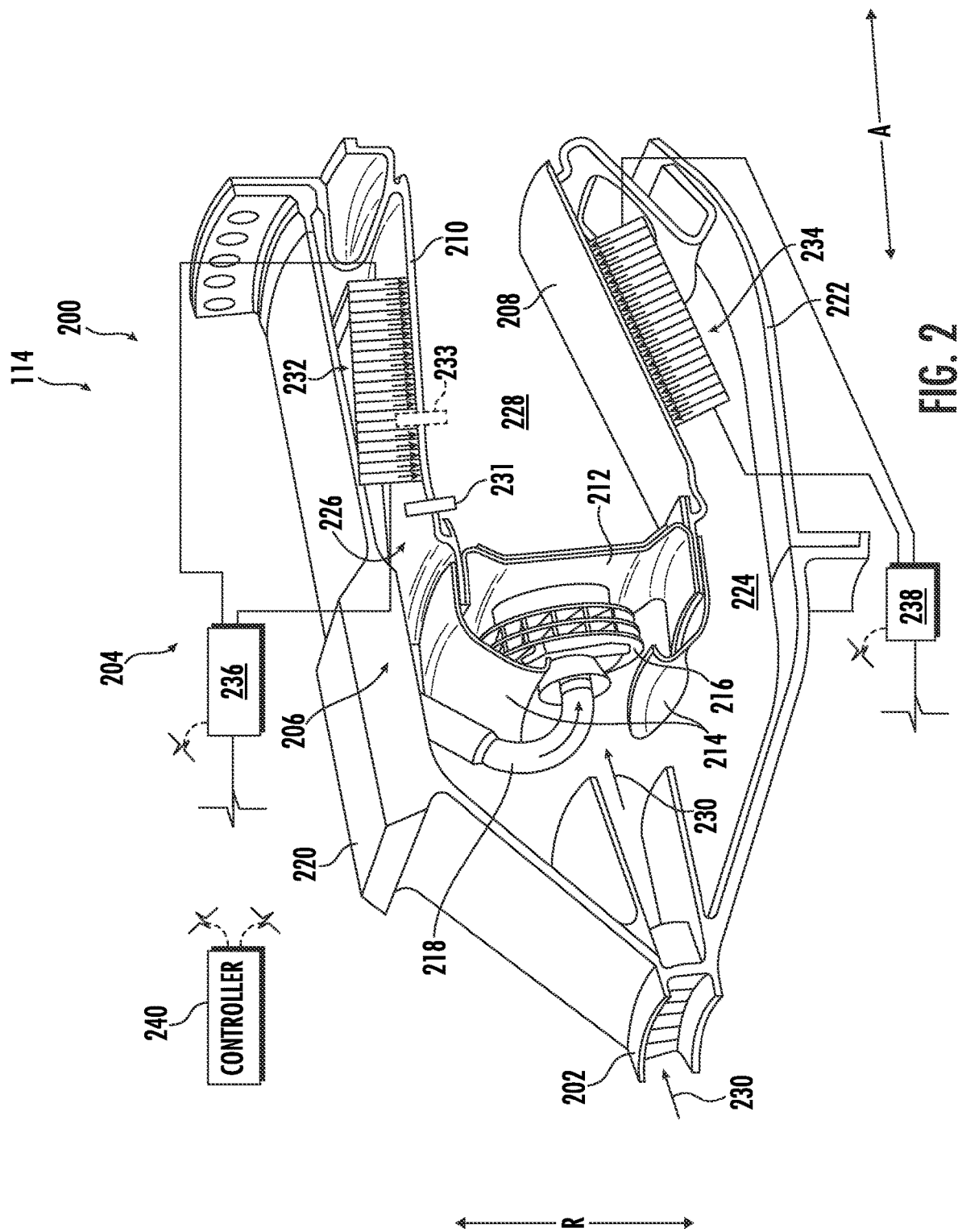
FIG. 2 is a perspective view of an integrated fuel cell and combustor assembly in accordance with the present disclosure.

Referring now to FIG. 2, illustrated schematically is a portion of the combustion section 114 including a portion of the integrated fuel cell and combustor assembly 200 used in the gas turbine engine 100 of FIG. 1, according to an embodiment of the present disclosure.

As will be appreciated, the combustion section 114 includes a compressor diffuser nozzle 202 and extends between an upstream end and a downstream end generally along the axial direction A. The combustion section 114 is fluidly coupled to the compressor section at the upstream end via the compressor diffuser nozzle 202 and to the turbine section at the downstream end.

The integrated fuel cell and combustor assembly 200 generally includes a fuel cell assembly 204 (only partially depicted in FIG. 2; see also FIGS. 3 through 5) and a combustor 206. The combustor 206 includes an inner liner 208, an outer liner 210, a dome assembly 212, a cowl assembly 214, a swirler assembly 216, and a fuel flowline 218. The combustion section 114 generally includes an outer casing 220 outward of the combustor 206 along the radial direction R to enclose the combustor 206 and an inner casing 222 inward of the combustor 206 along the radial direction R. The inner casing 222 and inner liner 208 define an inner passageway 224 therebetween, and the outer casing 220 and outer liner 210 define an outer passageway 226 therebetween. The inner casing 222, the outer casing 220, and the dome assembly 212 together define at least in part a combustion chamber 228 of the combustor 206.

The dome assembly 212 is disposed proximate the upstream end of the combustion section 114 (i.e., closer to the upstream end than the downstream end) and includes an opening (not labeled) for receiving and holding the swirler assembly 216. The swirler assembly 216 also includes an opening for receiving and holding the fuel flowline 218. The fuel flowline 218 is further coupled to the fuel source 148 (see FIG. 1) disposed outside the outer casing 220 along the radial direction R and configured to receive the fuel from the fuel source 148. In such a manner, the fuel flowline 218 may be fluidly coupled to the one or more fuel delivery lines 150 described above with reference to FIG. 1.

The swirler assembly 216 can include a plurality of swirlers (not shown) configured to swirl the compressed fluid before injecting it into the combustion chamber 228 to generate combustion gas. The cowl assembly 214, in the embodiment depicted, is configured to hold the inner liner 208, the outer liner 210, the swirler assembly 216, and the dome assembly 212 together.

During operation, the compressor diffuser nozzle 202 is configured to direct a compressed fluid 230 from the compressor section to the combustor 206, where the compressed fluid 230 is configured to be mixed with fuel within the swirler assembly 216 and combusted within the combustion chamber 228 to generate combustion gasses. The combustion gasses are provided to the turbine section to drive one or more turbines of the turbine section (e.g., the high pressure turbine 116 and low pressure turbine 118).

During operation of the gas turbine engine 100 including the integrated fuel cell and combustor assembly 200, a flame within the combustion chamber 228 is maintained by a continuous flow of fuel and air. In order to provide for an ignition of the fuel and air, e.g., during a startup of the gas turbine engine 100, the integrated fuel cell and combustor assembly 200 further includes an ignitor 231. The ignitor 231 may provide a spark or initial flame to ignite a fuel and air mixture within the combustion chamber 228. In certain exemplary embodiments, the integrated fuel cell and combustor assembly 200 may additionally include a dedicated fuel cell ignitor 233 (depicted in phantom). In particular, for the embodiment of FIG. 2, the dedicated fuel cell ignitor 233 is positioned downstream of at least a portion of a fuel cell, and in particular of a fuel cell stack (described below). In such a manner, the dedicated fuel cell ignitor 233 may more effectively combust output products of the fuel cell.

As mentioned above and depicted schematically in FIG. 2, the integrated fuel cell and combustor assembly 200 further includes the fuel cell assembly 204. The exemplary fuel cell assembly 204 depicted includes a first fuel cell stack 232 and a second fuel cell stack 234. More specifically, the first fuel cell stack 232 is configured with the outer liner 210 and the second fuel cell stack 234 is configured with the inner liner 208. More specifically, still, the first fuel cell stack 232 is integrated with the outer liner 210 and the second fuel cell stack 234 is integrated with the inner liner 208. Operation of the fuel cell assembly 204, and more specifically of a fuel cell stack (e.g., first fuel cell stack 232 or second fuel cell stack 234) of the fuel cell assembly 204 will be described in more detail below.

For the embodiment depicted, the fuel cell assembly 204 is configured as a solid oxide fuel cell ("SOFC") assembly, with the first fuel cell stack 232 configured as a first SOFC fuel cell stack and the second fuel cell stack 234 configured as a second SOFC fuel cell stack (each having a plurality of SOFC's). As will be appreciated, a SOFC is generally an electrochemical conversion device that produces electricity directly from oxidizing a fuel. In generally, fuel cell assemblies, and in particular fuel cells, are characterized by an electrolyte material utilized. The SOFC's of the present disclosure may generally include a solid oxide or ceramic electrolyte. This class of fuel cells generally exhibit high combined heat and power efficiency, long-term stability, fuel flexibility, and low emissions.

Moreover, the exemplary fuel cell assembly 204 further includes a first power converter 236 and a second power converter 238. The first fuel cell stack 232 is in electrical communication with the first power converter 236 by a first plurality of power supply cables (not labeled), and the second fuel cell stack 234 is in electrical communication with the second power converter 238 by a second plurality of power supply cables (not labeled).

The first power converter 236 controls the electrical current drawn from the corresponding first fuel cell stack 232 and may convert the electrical power from a direct current ("DC") power to either DC power at another voltage level or alternating current ("AC") power. Similarly, the second power converter 238 controls the electrical current drawn from the second fuel cell stack 234 and may convert the electrical power from a DC power to either DC power at another voltage level or AC power. The first power converter 236, the second power converter 238, or both may be electrically coupled to an electric bus (such as the electric bus 326 described below).

The integrated fuel cell and combustor assembly 200 further includes a fuel cell controller 240 that is in operable communication with both of the first power converter 236 and second power converter 238 to, e.g., send and receive communications and signals therebetween. For example, the fuel cell controller 240 may send current or power setpoint signals to the first power converter 236 and second power converter 238, and may receive, e.g., a voltage or current feedback signal from the first power converter 236 and second power converter 238. The fuel cell controller 240 may be configured in the same manner as the controller 240 described below with reference to FIG. 4.

Figure 3:
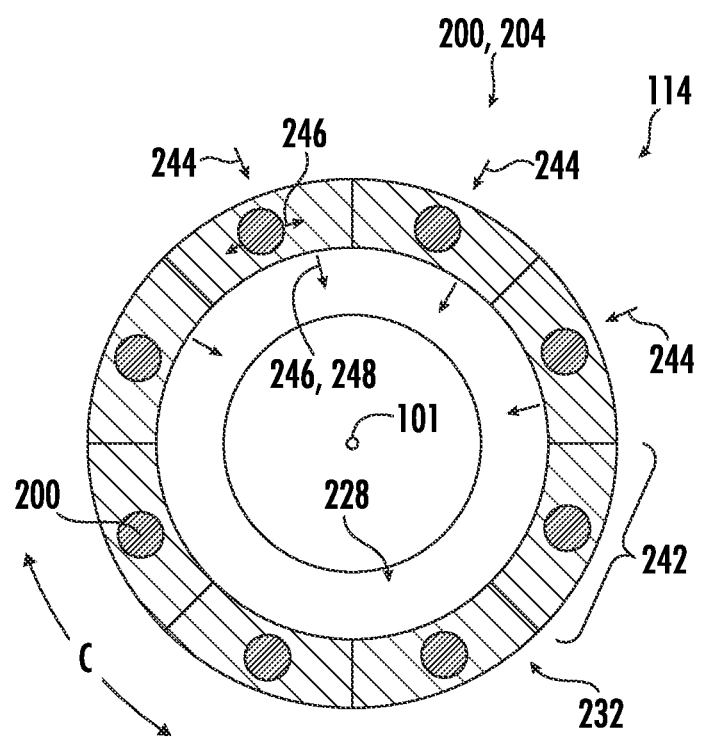
FIG. 3 is a schematic, axial view of the exemplary integrated fuel cell and combustor assembly of FIG. 2.

It will be appreciated that in at least certain exemplary embodiments the first fuel cell stack 232, the second fuel cell stack 234, or both may extend substantially 360 degrees in a circumferential direction C of the gas turbine engine (i.e., a direction extending about the centerline axis 101 of the gas turbine engine 100). For example, referring now to FIG. 3, a simplified cross-sectional view of the integrated fuel cell and combustor assembly 200 is depicted according to an exemplary embodiment of the present disclosure. Although only the first fuel cell stack 232 is depicted in FIG. 3 for simplicity, the second fuel cell stack 234 may be configured in a similar manner.

As shown, the first fuel cell stack 232 extends around the combustion chamber 228 in the circumferential direction C, completely encircling the combustion chamber 228 around the centerline axis 101 in the embodiment shown. More specifically, the first fuel cell stack 232 includes a plurality of fuel cells 242 arranged along the circumferential direction C. The fuel cells 242 that are visible in FIG. 3 can be a single ring of fuel cells 242, with fuel cells 242 stacked together along the axial direction A (see FIG. 2) to form the first fuel cell stack 232. In another instance, a plurality of additional rings of fuel cells 242 can be placed on top of each other to form the first fuel cell stack 232 that is elongated along the centerline axis 101.

As will be explained in more detail, below, with reference to FIG. 4, the fuel cells 242 in the first fuel cell stack 232 are positioned to receive discharged air 244 from, e.g., the compressor section and fuel 246 from the fuel delivery system 146. The fuel cells 242 generate electrical current using this air 244 and at least some of this fuel 246, and radially direct partially oxidized fuel 246 and unused portion of air 248 into the combustion chamber 228 toward the centerline axis 101. The integrated fuel cell and combustor assembly 200 combusts the partially oxidized fuel 246 and air 248 in the combustion chamber 228 into combustion gasses that are directed downstream into the turbine section to drive or assist with driving the one or more turbines therein.

Figure 4:
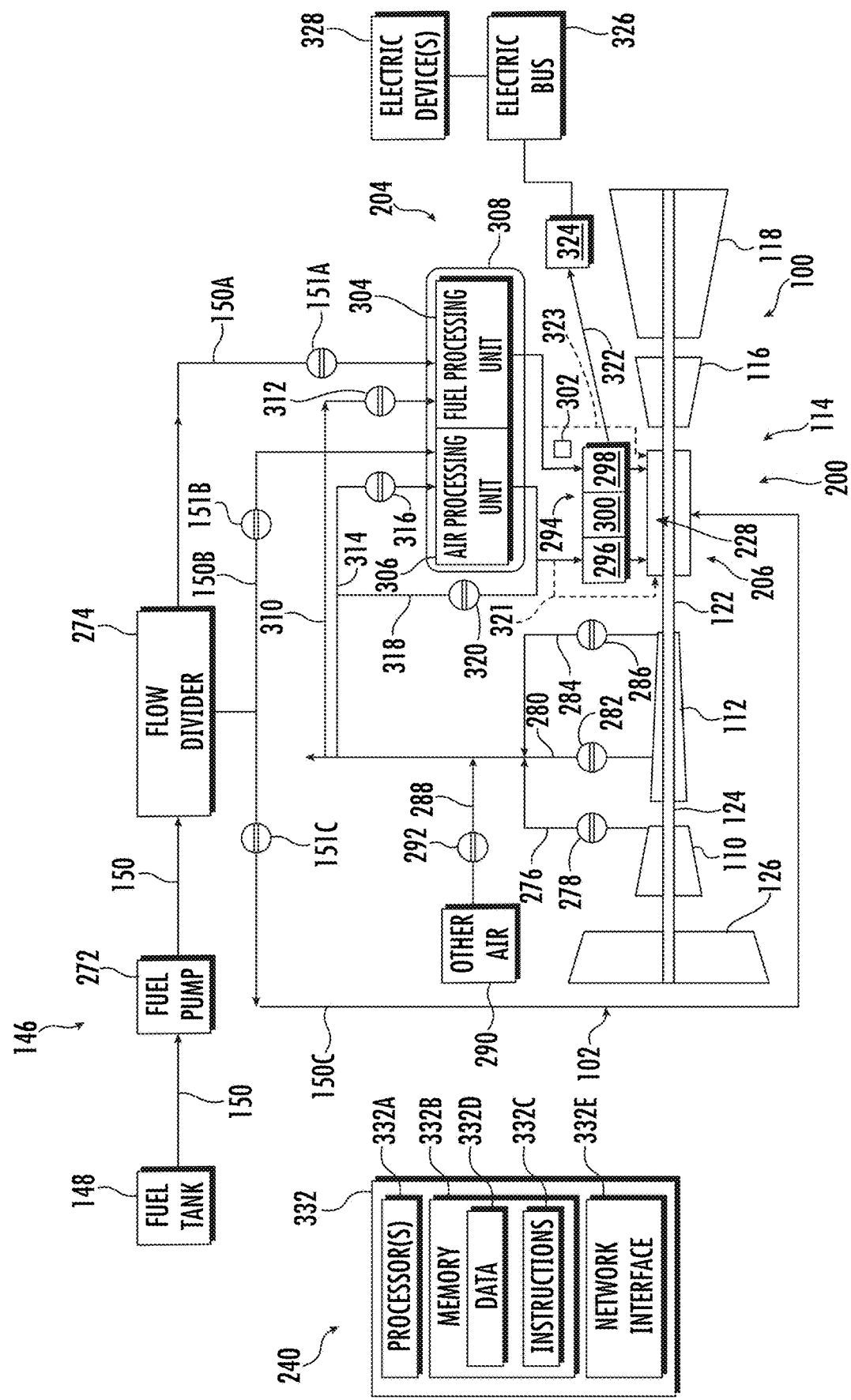
FIG. 4 is a schematic view of a fuel cell assembly in accordance with an exemplary aspect of the present disclosure as may be incorporated into the exemplary integrated fuel cell and combustor assembly of FIG. 2.

Referring now to FIG. 4, operation of an integrated fuel cell and combustor assembly 200 in accordance with an exemplary embodiment of the present disclosure will be described. More specifically, FIG. 4 provides a schematic illustration of a gas turbine engine 100 and an integrated fuel cell and combustor assembly 200 according to an embodiment of the present disclosure. The gas turbine engine 100 and integrated fuel cell and combustor assembly 200 may, in certain exemplary embodiments, be configured in a similar manner as one or more of the exemplary embodiments of FIGS. 1 through 4.

Accordingly, it will be appreciated that the gas turbine engine 100 generally includes a fan section 102 having a fan 126, an LP compressor 110, an HP compressor 112, a combustion section 114, an HP turbine 116, and an LP turbine 118. The combustion section 114 generally includes the integrated fuel cell and combustor assembly 200 having a combustor 206 and a fuel cell assembly 204.

A propulsion system including the gas turbine engine 100 further includes a fuel delivery system 146. The fuel delivery system 146 generally includes a fuel source 148 and one or more fuel delivery lines 150. The fuel source 148 may include a supply of fuel (e.g., a hydrocarbon fuel, including, e.g., a carbon-neutral fuel or synthetic hydrocarbons) for the gas turbine engine 100. In addition, it will be appreciated that the fuel delivery system 146 also includes a fuel pump 272 and a flow divider 274, and the one or more fuel delivery lines 150 include a first fuel delivery line 150A, a second fuel delivery line 150B, and a third fuel delivery line 150C. The flow divider 274 divides the fuel flow from the fuel source 148 and fuel pump 272 into a first fuel flow through the first fuel delivery line 150A to the fuel cell assembly 204, a second fuel flow through the second fuel delivery line 150B also to the fuel cell assembly 204 (and in particular to an air processing unit, described below), and a third fuel flow through a third fuel delivery line 150C to the combustor 206. The flow divider 274 may include a series of valves (not shown) to facilitate such dividing of the fuel flow from the fuel source 148, or alternatively may be of a fixed geometry. Additionally, for the embodiment shown, the fuel delivery system 146 includes a first fuel valve 151A associated with the first fuel delivery line 150A (e.g., for controlling the first fuel flow), a second fuel valve 151B associated with the second fuel delivery line 150B (e.g., for controlling the second fuel flow), and a third fuel valve 151C associated with the third fuel delivery line 150C (e.g., for controlling the third fuel flow).

The gas turbine engine 100 further includes a compressor bleed system and an airflow delivery system. More specifically, the compressor bleed system includes an LP bleed air duct 276 and an associated LP bleed air valve 278, an HP bleed air duct 280 and an associated HP bleed air valve 282, an HP exit air duct 284 and an associated HP exit air valve 286.

The gas turbine engine 100 further includes an air stream supply duct 288 (in airflow communication with an airflow supply 290) and an associated air valve 292, which is also in airflow communication with the airflow delivery system for providing compressed airflow to the fuel cell assembly 204 of the integrated fuel cell and combustor assembly 200. The airflow supply may be, e.g., a second gas turbine engine configured to provide a cross-bleed air, an auxiliary power unit (APU) configured to provide a bleed air, a ram air turbine (RAT), etc. The airflow supply may be complimentary to the compressor bleed system if the compressor air source is inadequate or unavailable.

The compressor bleed system (and air stream supply duct 288) is in airflow communication with airflow delivery system for providing compressed airflow to the fuel cell assembly 204, as will be explained in more detail below.

Referring still to FIG. 4, the fuel cell assembly 204 of the integrated fuel cell and combustor assembly 200 includes a fuel cell stack 294. The fuel cell stack 294 is depicted schematically as a single fuel cell having a cathode side 296, an anode side 298, and an electrolyte 300 positioned therebetween. As will generally be appreciated, the electrolyte 300 may, during operation, conduct negative oxygen ions from the cathode side 296 to the anode side 298 to generate an electric current and electric power.

Briefly, it will be appreciated that the fuel cell assembly 204 further includes a fuel cell sensor 302 configured to sense data indicative of a fuel cell assembly operating parameter, such as a temperature of the fuel cell stack 294 (e.g., of the cathode side 296 or anode side 298 of the fuel cell), a pressure within the fuel cell stack 294 (e.g., of within the cathode side 296 or anode side 298 of the fuel cell).

The fuel cell stack 294 is disposed downstream of the LP compressor 110, the HP compressor 112, or both. Further, as will be appreciated from the description above with respect to FIG. 2, the fuel cell stack 294 may be coupled to or otherwise integrated with a liner of the combustor 206 (e.g., an inner liner 208 or an outer liner 210). In such a manner, the fuel cell stack 294 may also be arranged upstream of a combustion chamber 228 of the integrated fuel cell and combustor assembly 200, and further upstream of the HP turbine 116 and LP turbine 118.

As shown in FIG. 4, the fuel cell assembly 204 also includes a fuel processing unit 304 and an air processing unit 306. The fuel processing unit 304 may be any suitable structure for generating a hydrogen rich fuel stream. For example, the fuel processing unit 304 may include a fuel reformer or a catalytic partial oxidation convertor (CPOx) for developing the hydrogen rich fuel stream for the fuel cell stack 294. The air processing unit 306 may be any suitable structure for raising the temperature of air that is provided thereto to a temperature high enough to enable fuel cell temperature control (e.g., about 600° C. to about 800° C.). For example, in the embodiment depicted, the air processing unit includes a preburner system, operating based on a fuel flow through the second fuel delivery line 150B, configured for raising the temperature of the air through combustion, e.g., during transient conditions such as startup, shutdown and abnormal situations.

In the exemplary embodiment depicted, the fuel processing unit 304 and air processing unit 306 are within a housing 308 to provide conditioned air and fuel to the fuel cell stack 294.

It should be appreciated, however, that the fuel processing unit 304 may additionally or alternatively include any suitable type of fuel reformer, such as an autothermal reformer and steam reformer that may need an additional stream of steam inlet with higher hydrogen composition at the reformer outlet stream. Additionally, or alternatively, still, the fuel processing unit 304 may include a reformer integrated with the fuel cell stack 294. Similarly, it should be appreciated that the air processing unit 306 of FIG. 4 could alternatively be a heat exchanger or another device for raising the temperature of the air provided thereto to a temperature high enough to enable fuel cell temperature control (e.g., about 600° C. to about 800° C.).

As mentioned above, the compressor bleed system (and air stream supply duct 288) is in airflow communication with airflow delivery system for providing compressed airflow to the fuel cell assembly 204. The airflow delivery system includes an anode airflow duct 310 and an associated anode airflow valve 312 for providing an airflow to the fuel processing unit 304, a cathode airflow duct 314 and associated cathode airflow valve 316 for providing an airflow to the air processing unit 306, and a cathode bypass air duct 318 and an associated cathode bypass air valve 320 for providing an airflow directly to the fuel cell stack 294 (or rather to the cathode side 296 of the fuel cell(s)). The fuel delivery system 146 is configured to provide the first flow of fuel through the first fuel delivery line 150A to the fuel processing unit 304, and the second flow of fuel through the second fuel delivery line 150B to the air processing unit 306 (e.g., as fuel for a preburner system, if provided).

The fuel cell stack 294 outputs the power produced as a fuel cell power output 322. Further, the fuel cell stack 294 directs a cathode air discharge and an anode fuel discharge (neither labeled for clarity purposes) into the combustion chamber 228 of the combustor 206.

In operation, the air processing unit 306 is configured to heat/cool a portion of the compressed air, incoming through the cathode airflow duct 314, to generate a processed air to be directed into the fuel cell stack 294 to facilitate the functioning of the fuel cell stack 294. The air processing unit 306 receives the second flow of fuel from the second fuel delivery line 150B and may, e.g., combust such second flow of fuel to heat the air received to a desired temperature (e.g., about 600° C. to about 800° C.) to facilitate the functioning of the fuel cell stack 294. The air processed by the air processing unit 306 is directed into the fuel cell stack 294. In an embodiment of the disclosure, as is depicted, the cathode bypass air duct 318 and the air processed by the air processing unit 306 may combine into a combined air stream to be fed into a cathode of the fuel cell stack 294.

Further, as shown in the embodiment of FIG. 4, the first flow of fuel through the first fuel delivery line 150A is directed to the fuel processing unit 304 for developing a hydrogen rich fuel stream (e.g., optimizing a hydrogen content of a fuel stream), to also be fed into the fuel cell stack 294. As will be appreciated, and as discussed below, the flow of air (processed air and bypass air) to the fuel cell stack 294 (e.g., the cathode side 296) and fuel from the fuel processing unit 304 to the fuel cell stack 294 (e.g., the anode side 298) may facilitate electrical power generation.

Because the inlet air for the fuel cell stack 294 may come solely from the upstream compressor section without any other separately controlled air source, it will be appreciated that the inlet air for the fuel cell stack 294 discharged from the compressor section is subject to the air temperature changes that occur at different flight stages. By way of illustrative example only, the air within a particular location in the compressor section of the gas turbine engine 100 may work at 200° C. during idle, 600° C. during take-off, 268° C. during cruise, etc. This type of temperature change to the inlet air directed to the fuel cell stack 294 may lead to significant thermal transient issues (or even thermal shock) to the ceramic materials of the fuel cell stack 294, which could range from cracking to failure.

Thus, by fluidly connecting the air processing unit 306 between the compressor section and the fuel cell stack 294, the air processing unit 306 may serve as a control device or system to maintain the air processed by the air processing unit 306 and directed into the fuel cell stack 294 within a desired operating temperature range (e.g., plus or minus 100° C., or preferably plus or minus 50° C., or plus or minus 20° C.). In operation, the temperature of the air that is provided to the fuel cell stack 294 can be controlled (relative to a temperature of the air discharged from the compressor section) by controlling the flow of fuel to the air processing unit 306. By increasing a fuel flow to the air processing unit 306, a temperature of the airflow to the fuel cell stack 294 may be increased. By decreasing the fuel flow to the air processing unit 306, a temperature of the airflow to the fuel cell stack 294 may be decreased. Optionally, no fuel can be delivered to the air processing unit 306 to prevent the air processing unit 306 from increasing and/or decreasing the temperature of the air that is discharged from the compressor section and directed into the air processing unit 306.

Moreover, as is depicted in phantom, the fuel cell assembly 204 further includes an airflow bypass duct 321 extending around the fuel cell stack 294 to allow a portion or all of an airflow conditioned by the air processing unit 306 (and combined with any bypass air through duct 318) to bypass the cathode side 296 of the fuel cell stack 294 and go directly to the combustion chamber 228. The bypass duct 321 may be in thermal communication with the fuel cell stack 294. The fuel cell assembly further includes a fuel bypass duct 323 extending around the fuel cell stack 294 to allow a portion or all of a reformed fuel from the fuel processing unit 304 to bypass the anode side 298 of the fuel cell stack 294 and go directly to the combustion chamber 228.

As briefly mentioned above, the fuel cell stack 294 converts the anode fuel stream from the fuel processing unit 304 and air processed by the air processing unit 306 sent into the fuel cell stack 294 into electrical energy, the fuel cell power output 322, in the form of DC current. This fuel cell power output 322 is directed to a power convertor 324 in order to change the DC current into DC current or AC current that can be effectively utilized by one or more subsystems. In particular, for the embodiment depicted, the electrical power is provided from the power converter to an electric bus 326. The electric bus 326 may be an electric bus dedicated to the gas turbine engine 100, an electric bus of an aircraft incorporating the gas turbine engine 100, or a combination thereof. The electric bus 326 is in electric communication with one or more additional electrical devices 328, which may be a power source, a power sink, or both. For example, the additional electrical devices 328 may be a power storage device (such as one or more batteries), an electric machine (an electric generator, an electric motor, or both), an electric propulsion device, etc. For example, the one or more additional electrical devices 328 may include the starter motor/generator of the gas turbine engine 100.

Moreover, as is further depicted schematically in FIG. 4, the propulsion system, an aircraft including the propulsion system, or both, includes a controller 240. For example, the controller 240 may be a standalone controller, a gas turbine engine controller (e.g., a full authority digital engine control, or FADEC), an aircraft controller, supervisory controller for a propulsion system, a combination thereof, etc.

The controller 240 is operably connected to various the sensors, valves, etc. within at least one of the gas turbine engine 100 and the fuel delivery system 146. More specifically, for the exemplary aspect depicted, the controller 240 is operably connected to the valves of the compressor bleed system (valves 278, 282, 286), the airflow delivery system (valves 312, 316, 320), and the fuel delivery system 146 (flow divider 274, valves 151A, 151B, 151C) of the gas turbine engine 100 and the fuel cell sensor 302. As will be appreciated from the description below, the controller 240 may be in wired or wireless communication with these components. In this manner, the controller 240 may receive data from a variety of inputs (including the fuel cell sensor 302), may make control decisions, and may provide data (e.g., instructions) to a variety of output (including the valves of the compressor bleed system to control an airflow bleed from the compressor section, the airflow delivery system to direct the airflow bled from the compressor section, and the fuel delivery system 146 to direct the fuel flow within the gas turbine engine 100).

Referring particularly to the operation of the controller 240, in at least certain embodiments, the controller 240 can include one or more computing device(s) 332. The computing device(s) 332 can include one or more processor(s) 332A and one or more memory device(s) 332B. The one or more processor(s) 332A can include any suitable processing device, such as a microprocessor, microcontroller, integrated circuit, logic device, and/or other suitable processing device. The one or more memory device(s) 332B can include one or more computer-readable media, including, but not limited to, non-transitory computer-readable media, RAM, ROM, hard drives, flash drives, and/or other memory devices.

The one or more memory device(s) 332B can store information accessible by the one or more processor(s) 332A, including computer-readable instructions 332C that can be executed by the one or more processor(s) 332A. The instructions 332C can be any set of instructions that when executed by the one or more processor(s) 332A, cause the one or more processor(s) 332A to perform operations. In some embodiments, the instructions 332C can be executed by the one or more processor(s) 332A to cause the one or more processor(s) 332A to perform operations, such as any of the operations and functions for which the controller 240 and/or the computing device(s) 332 are configured, the operations for operating a propulsion system, as described herein, and/or any other operations or functions of the one or more computing device(s) 332. The instructions 332C can be software written in any suitable programming language or can be implemented in hardware. Additionally, and/or alternatively, the instructions 332C can be executed in logically and/or virtually separate threads on processor(s) 332A. The memory device(s) 332B can further store data 332D that can be accessed by the processor(s) 332A. For example, the data 332D can include data indicative of power flows, data indicative of gas turbine engine 100/aircraft operating conditions, and/or any other data and/or information described herein.

The computing device(s) 332 also includes a network interface 332E configured to communicate, for example, with the other components of the gas turbine engine 100 (such as the valves of the compressor bleed system (valves 278, 282, 286), the airflow delivery system (valves 312, 316, 320), and the fuel delivery system 146 (flow divider 274, valves 151A, 151B, 151C) of the gas turbine engine 100 and the fuel cell sensor 302), the aircraft incorporating the gas turbine engine 100, etc. The network interface 332E can include any suitable components for interfacing with one or more network(s), including for example, transmitters, receivers, ports, controllers, antennas, and/or other suitable components. In such a manner, it will be appreciated that the network interface 332E may utilize any suitable combination of wired and wireless communications network(s).

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or a plurality of computing devices working in combination. Databases, memory, instructions, and applications can be implemented on a single system or distributed across a plurality of systems. Distributed components can operate sequentially or in parallel.

It will be appreciated that the gas turbine engine 100, the exemplary fuel delivery system 146, the exemplary integrated fuel cell and combustor assembly 200, and the exemplary fuel cell assembly 204 are provided by way of example only. In other embodiments, the integrated fuel cell and combustor assembly 200 and fuel cell assembly 204 may have any other suitable configuration. For example, in other exemplary embodiments, the fuel cell assembly 204 may include any other suitable fuel processing unit 304. Additionally, or alternatively, the fuel cell assembly 204 may not require a fuel processing unit 304, e.g., when the combustor of the gas turbine engine 100 is configured to burn hydrogen fuel and the fuel delivery system 146 is configured to provide hydrogen fuel to the integrated fuel cell and combustor assembly 200, and in particular to the fuel cell assembly 204.

Figure 5:
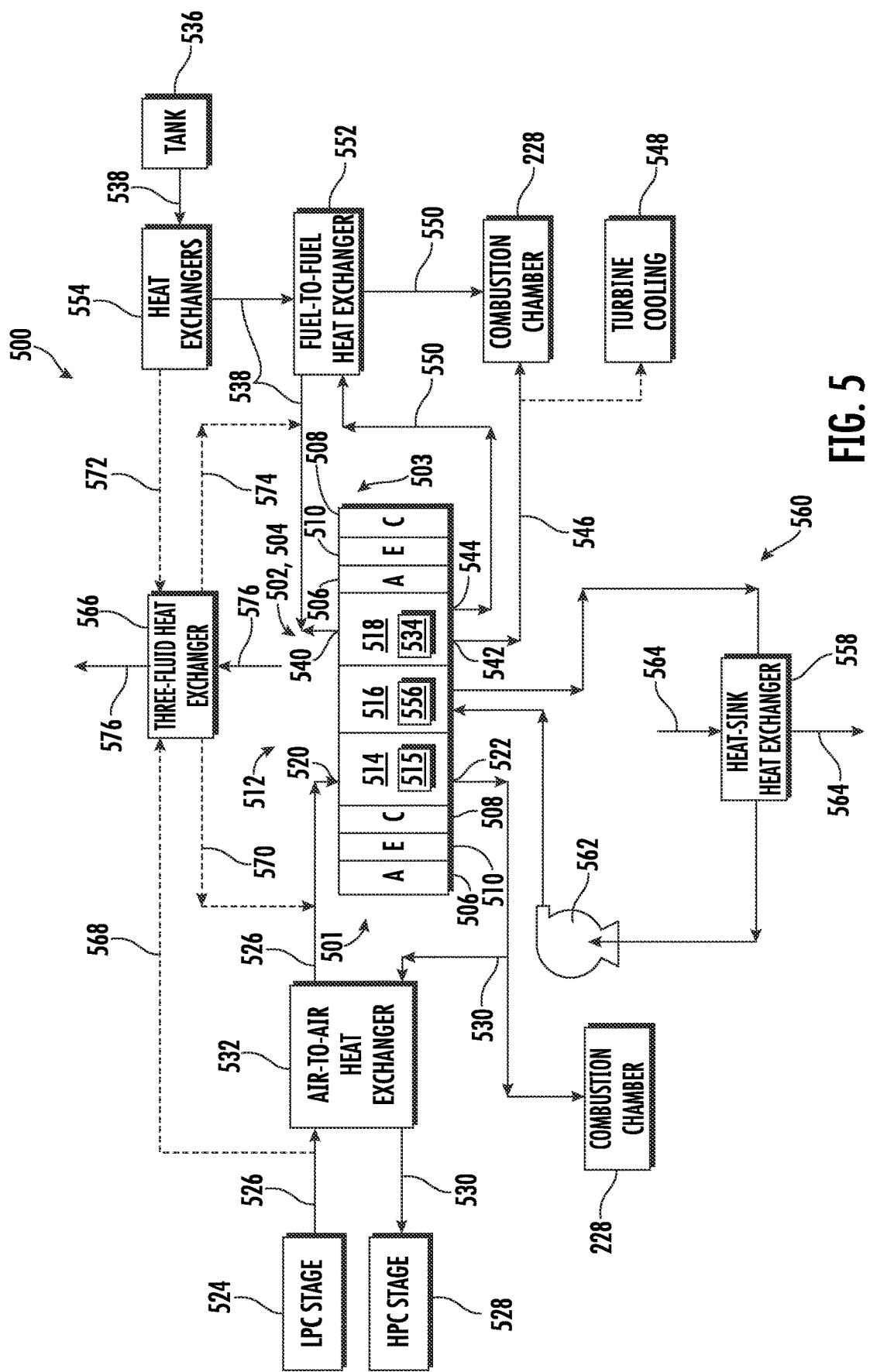
FIG. 5 is a schematic view of a thermal management system in accordance with exemplary aspects of the present disclosure.

Referring now to FIG. 5, a schematic view of a thermal management system 500 is illustrated in accordance with exemplary aspects of the present disclosure. For example, the thermal management system 500 may be incorporated in the propulsion system described above with reference to FIGS. 1 through 4. As shown, the thermal management system 500 may include a fuel cell assembly 502 (which may be the same as the fuel cell assembly 204 described above or a different fuel cell assembly). As shown in FIG. 5, the fuel cell assembly 502 may include a plurality of fuel cells 504 each having an anode 506, a cathode 508, and a solid electrolyte 510 disposed between the anode 506 and the cathode 508. For example, the fuel cell assembly 502 may include a first fuel cell 501 and a second fuel cell 503. In many embodiments, the fuel cell assembly 502 may include a bipolar separator plate 512 disposed between the first fuel cell 501 and the second fuel cell 503 of the plurality of fuel cells 504. Particularly, the bipolar separator plate 512 may include a cathode cell sub-unit 514, a coolant cell sub-unit 516, and an anode cell sub-unit 518. The cathode cell sub-unit 514 may be disposed adjacent (i.e., in contact) to the cathode 508 of the first fuel cell 501, and the anode cell sub-unit 518 may be disposed adjacent (i.e., in contact) to the anode 506 of the second fuel cell 503. The coolant cell sub-unit 516 may be disposed between the anode cell sub-unit 518 and the cathode cell sub-unit 514.

In various embodiments, the cathode cell sub-unit 514 may defines an oxidant channel 515 fluidly coupled to the compressor section. For example, the oxidant channel 515 may be in fluid communication with one or more stages of the compressor section, such that the oxidant channel 515 may receive a flow of air (e.g., bleed air) from a stage in the compressor section, utilize the flow of air for transferring heat from the plurality of fuel cells 504, and return the flow of air to the compressor section (e.g., to another of the one or more stages in the compressor section). Particularly, the oxidant channel 515 may include an oxidant inlet 520 and an oxidant outlet 522. The oxidant inlet 520 may be fluidly coupled to a low pressure compressor stage 524 of the compressor section via a bleed air line 526. The oxidant outlet 522 may be fluidly coupled to a high pressure compressor stage 528 of the compressor section via a cathode exhaust line 530. For example, the low pressure compressor stage 524 may be a stage in the LP compressor 110 described above with reference to FIG. 1, such that the oxidant channel 515 may receive a flow of low pressure air from the LP compressor 110. Similarly, the high pressure compressor stage 528 may be a stage in the HP compressor 112, such that air from the oxidant channel 515 may be returned to the HP compressor 112. Additionally, or alternatively, the oxidant outlet 522 may be fluidly coupled to the combustion chamber 228 such that the exhaust air from the oxidant channel 515 is directly sent to the combustion chamber 228.

In some embodiments, an air-to-air heat exchanger 532 (e.g., a first recuperator heat exchanger) may thermally couple the bleed air line 526 and the cathode exhaust line 530. For example, the air-to-air heat exchanger 532 may exchange heat between the air in the bleed air line 526 and the air in the cathode exhaust line 530. The air-to-air heat exchanger 532 may be disposed in fluid communication on the bleed air line 526 upstream of the oxidant channel 515 with respect to a flow of air through the bleed air line 526. Further, the air-to-air heat exchanger 532 may be disposed in fluid communication on the cathode exhaust line 530 downstream of the oxidant channel 515 with respect to a flow of air through the cathode exhaust line 530.

In exemplary embodiment, the anode cell sub-unit 518 may define a fuel channel 534 that is fluidly coupled to the combustion section. For example, the fuel channel 534 may receive a flow of fuel (e.g., liquid hydrogen or other suitable fuel) from a fuel tank 536 via a fuel supply line 538. In particular, the fuel channel 534 may include a fuel inlet 540 and one or more outlets (e.g., a first outlet 542 and a second outlet 544). In many embodiments, the fuel inlet 540 may be fluidly coupled to the fuel supply line 538. The one or more outlets 542, 544 may be fluidly coupled to the combustion chamber 228. Particularly, the first outlet 542 of the fuel channel 534 may exhaust water 546 from the anode 506 (e.g., anode water). The water 546 may be provided to one or both of the combustion chamber 228 to reduce nitrogen oxide (NOx) emission and/or the turbine section for turbine cooling 548. The water 546 may be provided to one or more stages in the turbine section. For example, turbine cooling 548 may include cooling of one or more turbine section components (e.g., one or more turbine rotor blades, stator vanes, or other components in the turbine section). The second outlet 544 of the fuel channel 534 may exhaust excess fuel not utilized by the anode 506 in the fuel channel 534 via an excess fuel line 550.

In many embodiments, a fuel-to-fuel heat exchanger 552 (e.g., second recuperator heat exchanger) may thermally couple the fuel supply line 538 and the excess fuel line 550 from the fuel outlet 544. Particularly, the fuel-to-fuel heat exchanger 552 may be disposed in fluid communication on the fuel supply line 538 upstream of the fuel channel 534 with respect to the flow of fuel through the fuel supply line 538. Additionally, the fuel-to-fuel heat exchanger 552 may be disposed in fluid communication on the excess fuel line 550 downstream of the fuel channel 534 with respect to the flow of fuel through the excess fuel line 550.

In various embodiments, the thermal management system 500 may further include a series of heat exchangers 554 fluidly and thermally coupled to the fuel supply line 538 upstream of the fuel-to-fuel heat exchanger 552. The series of heat exchangers 554 may include an hydrogen-to-oil heat exchanger, a hydrogen-to-air heat exchanger, and/or a hydrogen-to-coolant (e.g., coolant from the fuel cell assembly dedicated coolant loop). The series of heat exchangers 554 may receive liquid hydrogen ($H_2$) from the fuel tank 536 and transfer heat to (or away from) the liquid hydrogen, such that the hydrogen provided to the fuel cell assembly 502 and/or the combustion chamber 228 has a desired temperature. Particularly, the hydrogen may leave the fuel tank 536 in a liquid state, and the hydrogen may be provided to the fuel cell assembly 502 and/or the combustion chamber 228 in a gaseous state.

In exemplary embodiments, the bipolar separator plate 512 may further include a coolant cell sub-unit 516 that defines a coolant channel 556. The coolant channel 556 may function to remove heat from the fuel cell assembly 502 as part of a thermal transport bus where the coolant acts as the working fluid being recirculated between the heat source (the fuel cell assembly 502, and more particularly the coolant channel 556) and the heat-sink heat exchanger 558 in a closed cycle loop.

For example, in many embodiments, the coolant channel 556 may be in fluid communication with a heat-sink heat exchanger 558, which may remove heat from the coolant. Particularly, the coolant channel may be disposed in fluid communication on a dedicated coolant loop or closed cycle loop 560. The dedicated coolant loop 560 may circulate coolant fluid (e.g., with a pump 562) through the coolant channel 556 and the heat-sink heat exchanger 558. The coolant fluid may be supercritical $CO_2$, air, water, or other suitable coolant fluid. The heat-sink heat exchanger 558 may thermally couple the coolant fluid within the dedicated coolant loop 560 with a sink fluid 564, such that the sink fluid 564 may remove heat from the coolant fluid via the heat-sink heat exchanger 558. The sink fluid 564 may be liquid hydrogen (e.g., from the fuel supply line 538), air, or other suitable fluids.

In many embodiments, each of the channels 515, 534, 556 defined in the bipolar separator plate 512 may be fluidly isolated from one another. For example, the oxidant channel 515 defined in the cathode cell sub-unit 514 of the bipolar separator plate 512, the fuel channel 534 defined in the anode cell sub-unit 518 of the bipolar separator plate 512, and the coolant channel 556 defined in the coolant cell sub-unit 516 may each be fluidly isolated from one another. Additionally, the oxidant channel 515 may be at least partially defined by the cathode 508 of the first fuel cell 501 in the plurality of fuel cells 504, such that the oxidant channel 515 is defined collectively by the cathode 508 and the cathode cell sub-unit 514. Similarly, the fuel channel 534 may be at least partially defined by the anode 506 of the second fuel cell 503 in the plurality of fuel cells 504, such that the fuel channel 534 is collectively defined by the anode 506 and the anode cell sub-unit 518.

In various embodiments, the thermal management system 500 may further include a three-fluid heat exchanger 566 in fluid communication with the oxidant channel 515 and the fuel channel 534 to preheat the fuel and air (prior to being sent to the fuel cell assembly) during transient conditions such as startup. For example, the three-fluid heat exchanger 566 may be fluidly coupled to the bleed air line 526 via an air supply line 568. The air supply line 568 may extend from the bleed air line 526, upstream of the air-to-air heat exchanger 532, to the three-fluid heat exchanger 566. An air return line 570 may extend from the three-fluid heat exchanger 566 to the bleed air line 526 downstream of the air-to-air heat exchanger 532. Additionally, the three-fluid heat exchanger 566 may be one of the series of heat exchangers 554, or may be a separate heat exchanger in addition to the series of heat exchangers 554. The three-fluid heat exchanger 566 may be fluidly coupled to the series of heat exchangers 554 (and/or the fuel supply line 538) via a fuel input line 572. A fuel output line 574 may extend from the three-fluid heat exchanger 566 to the fuel supply line 538 downstream of the fuel-to-fuel heat exchanger 552. Furthermore, the three-fluid heat exchanger 566 may receive a flow of exhaust gases 576 (e.g. from one or more nozzles or elsewhere), and the three-fluid heat exchanger 566 may exhaust the exhaust gases 576 to the atmosphere. In this way, the three-fluid heat exchanger 566 may exchange heat between air (prior to the air being sent to the fuel cell assembly 502), fuel (prior to the fuel being sent to the fuel cell assembly 502), and exhaust gases 576.

Figure 6:
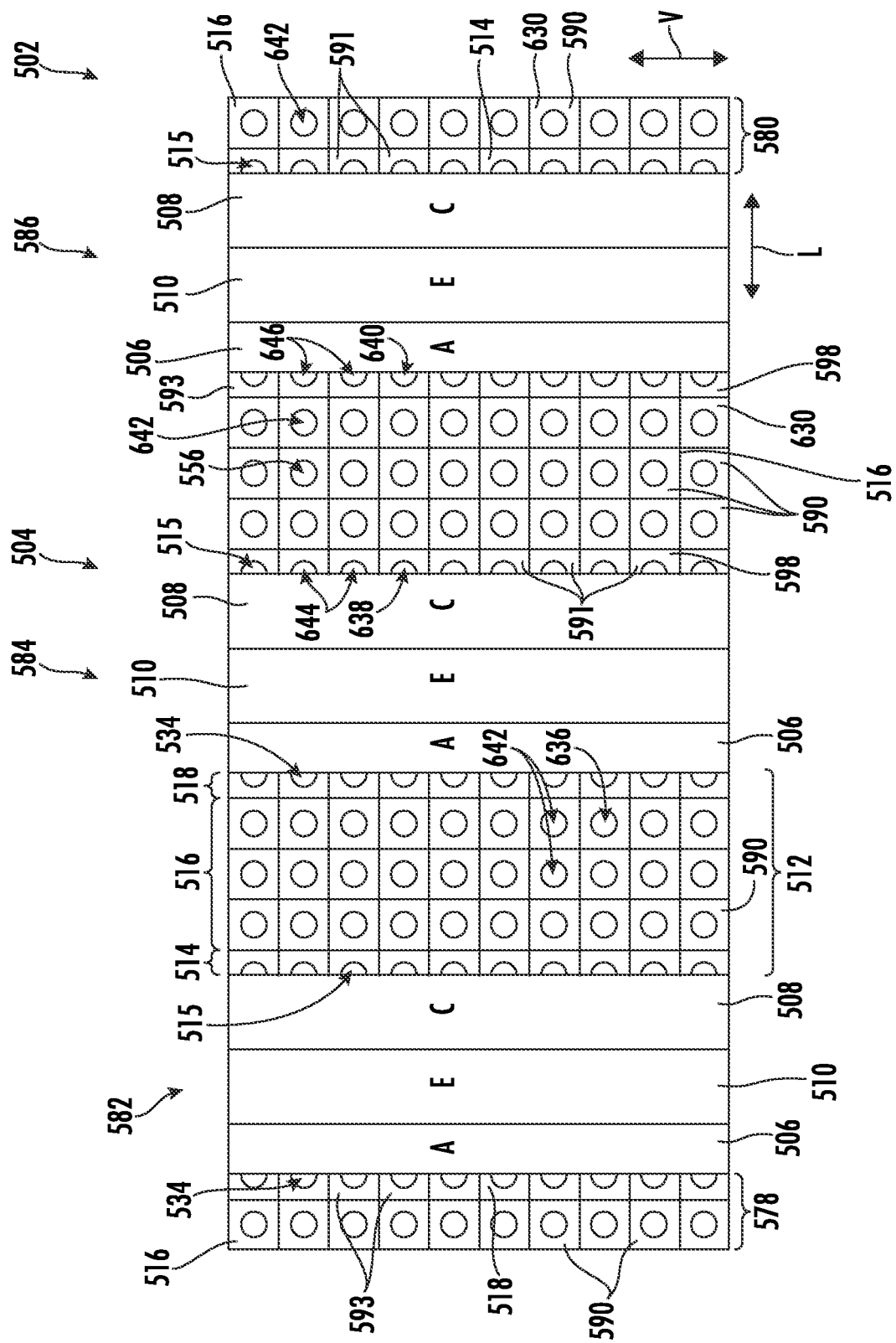
FIG. 6 is plan view of a fuel cell assembly in accordance with embodiments of the present disclosure.

Referring now to FIG. 6, a fuel cell assembly 502 is illustrated in accordance with embodiments of the present disclosure. As shown, the fuel cell assembly 502 may include a plurality of fuel cells 504 each having an anode 506, a cathode 508, and a solid electrolyte 510 disposed between the anode 506 and the cathode 508. For example, the fuel cell assembly 502 may include a first fuel cell 582, one or more intermediary fuel cells 584, and a last fuel cell 586. During operation of the fuel cell assembly 502, electrical current may flow from the anode 506 of the first fuel cell 582 to the cathode 508 of the last fuel cell 586.

In many embodiments, the fuel cell assembly 502 may include one or more bipolar separator plates 512 disposed between the plurality of fuel cells 504. Particularly, the bipolar separator plate 512 may include one or more fuel cell sub-units 514, 516, 518 each comprising a plurality of unit-cells 590, 591, 593. In exemplary embodiments, the one or more fuel cell sub-units 514, 516, 518 may include a cathode cell sub-unit 514, a coolant cell sub-unit 516, and an anode cell sub-unit 518. The cathode cell sub-unit 514 may be disposed adjacent (i.e., in contact) to the cathode 508 of the first fuel cell 582 (or one of the intermediary fuel cells 584), and the anode cell sub-unit 518 may be disposed adjacent (i.e., in contact) to the anode 506 of the last fuel cell 586 (or one of the intermediary fuel cells 584). The coolant cell sub-unit 516 may be disposed between the anode cell sub-unit 518 and the cathode cell sub-unit 514. Additionally, in many embodiments, the fuel cell assembly 502 may include end plates (e.g., a first end plate 578 and a second end plate 580) disposed on opposite sides of the fuel cell assembly 502. The first end plate 578 may be in contact with the anode 506 of the first fuel cell 582, and the second end plate 580 may be in contact with the cathode 508 of the last fuel cell 586.

In exemplary embodiments, the coolant cell sub-unit 516 may be collectively formed by the plurality of unit-cells 590, the cathode cell sub-unit 514 may be collectively formed by the plurality of unit-cells 591, and the anode cell sub-unit 518 may be collectively formed by the plurality of unit-cells 593. In many embodiments, the anode cell sub-unit 518 and the cathode cell sub-unit 514 may be formed from the same type of unit-cell, such that the anode cell sub-unit 518 and the cathode cell sub-unit 514 are substantially the same component disposed on opposite sides of the coolant cell sub-unit 516. In exemplary embodiments, each unit-cell in the plurality of unit-cells 590, 591, 593 may include an outer surface 630 (e.g., an exterior surface) and may define an internal volume 636, 638, 640 that extends in a plurality of directions (e.g., the vertical direction V, the longitudinal direction L, and the transverse direction T described below) between a plurality of openings 642, 644, 646 defined on the respective outer surface 630. Additionally, each unit-cell in the plurality of unit-cells 590, 591, 593 may be disposed adjacent to (and in contact with) a neighboring unit-cell in the plurality of unit-cells 590, 591, 593 such that the plurality of unit-cells 590, 591, 593 collectively define the one or more channels 515, 534, 556.

For example, each unit-cell 590 in the plurality of unit-cells 590 of the coolant cell sub-unit 516 may be disposed adjacent to (e.g., in contact with and fixedly coupled to) a neighboring unit-cell 590 in the plurality of unit-cells 590 of the coolant cell sub-unit 516, such that the plurality of unit-cells 590 of the coolant cell sub-unit 516 collectively define the coolant channel 556. Similarly, each unit-cell 591 in the plurality of unit-cells 591 of the cathode cell sub-unit 514 may be disposed adjacent to (e.g., in contact with and fixedly coupled to) a neighboring unit-cell 591 in the plurality of unit-cells 591 of the cathode cell sub-unit 514, such that the plurality of unit-cells 591 of the cathode cell sub-unit 514 collectively define the oxidant channel 515. Likewise, each unit-cell 593 in the plurality of unit-cells 593 of the anode cell sub-unit 518 may be disposed adjacent to (e.g., in contact with and fixedly coupled to) a neighboring unit-cell 593 in the plurality of unit-cells 593 of the anode cell sub-unit 518, such that the plurality of unit-cells 593 of the anode cell sub-unit 518 collectively define the fuel channel 534.

In exemplary embodiments, at least one opening of the plurality of openings 642, 644, 646 of each unit-cell in the plurality of unit-cells 590, 591, 593 may align with a neighboring opening of the plurality of openings 642, 644, 646 in the neighboring unit-cell of the plurality of unit-cells 590, 591, 593 such that the internal volume 636, 638, 640 of each unit-cell of the plurality of unit-cells 590, 591, 593 collectively define the one or more channels 515, 534, 556. For example, at least one opening 642 of the plurality of openings 642 of each unit-cell 590 in the coolant cell sub-unit 516 may align with a neighboring opening 642 in a neighboring unit-cell 590 in the coolant cell sub-unit 516, such that the internal volumes 636 of the plurality of unit-cells 590 in the coolant cell sub-unit 516 collectively define the coolant channel 556. Similarly, at least one opening 644 of the plurality of openings 644 of each unit-cell 591 in the cathode cell sub-unit 514 may align with a neighboring opening 644 in a neighboring unit-cell 591 in the cathode cell sub-unit 514, such that the internal volumes 638 of the plurality of unit-cells 591 in the cathode cell sub-unit 514 collectively define the oxidant channel 515. Likewise, at least one opening 646 of the plurality of openings 646 of each unit-cell 593 in the anode cell sub-unit 518 may align with a neighboring opening 646 in a neighboring unit-cell 593 in the anode cell sub-unit 518, such that the internal volumes 640 of the plurality of unit-cells 593 in the anode cell sub-unit 518 collectively define the fuel channel 534.

The multidirectional internal volumes 636, 638, 640 of each unit-cell 590, 591, 593 advantageously increases the thermal distribution and heat transfer efficiency of the entire bipolar separator plate 512, thereby extending the hardware life of the bipolar separator plate 512 and increasing the efficiency of the fuel cell assembly 502.

In many embodiments, the bipolar separator plate 512 described herein may be integrally formed as a single component. That is, each of the subcomponents, e.g., the cathode cell sub-unit 514, the coolant cell sub-unit 516, and the anode cell sub-unit 518, and any other subcomponent of the bipolar separator plate 512 (such as the plurality of unit-cells 590, 591, 593), may be manufactured together as a single body or object. In exemplary implementations, this may be done by utilizing an additive manufacturing system and method, such as direct metal laser sintering (DMLS), direct metal laser melting (DMLM), or other suitable additive manufacturing techniques. In other embodiments, other manufacturing techniques, such as casting or other suitable techniques, may be used. In this regard, by utilizing additive manufacturing methods, the bipolar separator plate 512 may be integrally formed as a single piece of continuous metal and may thus include fewer sub-components and/or joints compared to prior designs. The integral formation of the bipolar separator plate 512 through additive manufacturing may advantageously improve the overall assembly process. For example, the integral formation reduces the number of separate parts that are assembled, thus reducing associated time and overall assembly costs. Additionally, existing issues with, for example, leakage, joint quality between separate parts, and overall performance may advantageously be reduced.

Figure 7:
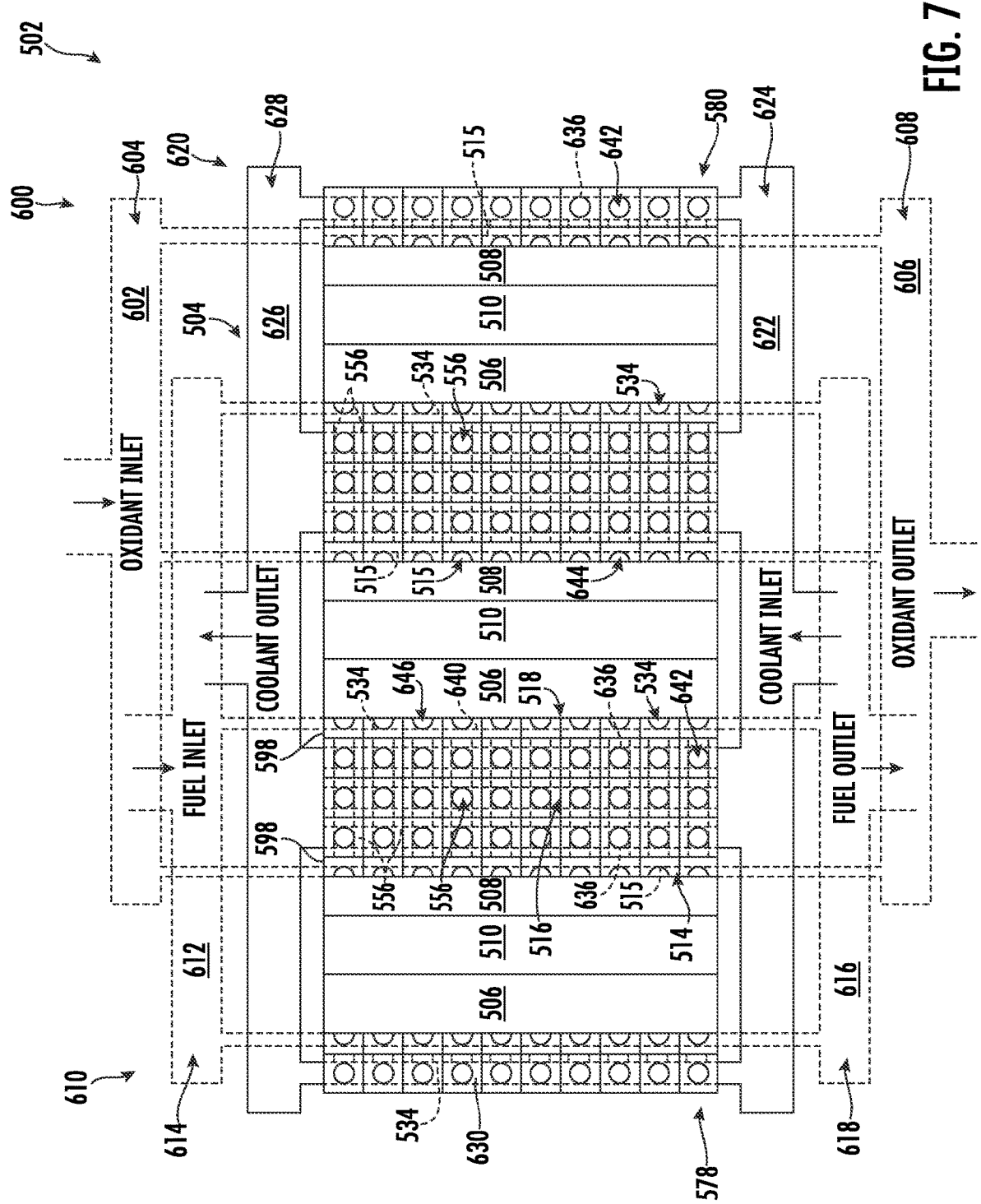
FIG. 7 is a schematic view of a fuel cell assembly having one or more fluid connections in accordance with embodiments of the present disclosure.

Referring now to FIG. 7, a fuel cell assembly 502 having one or more fluid connections is illustrated in accordance with embodiments of the present disclosure. In exemplary embodiments, the one or more channels 515, 534, 556 may include an oxidant channel 515 defined in a cathode cell sub-unit 514 of the one or more fuel cell sub-units, a coolant channel 556 defined in a coolant cell sub-unit 516 of the one or more fuel cell sub-units, and a fuel channel 556 defined in an anode cell sub-unit 518 of the one or more fuel cell sub-units. In various embodiments, the oxidant channel 515, the coolant channel 556, and the fuel channel 534 are fluidly isolated from one another. For example, the cathode cell sub-unit 514 and the anode cell sub-unit 518 may each include a solid wall portion 598 that contacts the coolant cell sub-unit 516 to fluidly isolate the one or more channels 515, 534, 556. Particularly, the coolant cell sub-unit 516 may be disposed between the solid wall portion 598 of the cathode cell sub-unit 514 and the solid wall portion 598 of the anode cell sub-unit 518. The oxidant channel 515 may be at least partially defined by a cathode 508 in the plurality of fuel cells 504, such that the oxidant channel 515 is defined collectively by the cathode 508 and the cathode cell sub-unit 514. Similarly, the fuel channel 534 may be at least partially defined by an anode 506 in the plurality of fuel cells 504, such that the fuel channel 534 is collectively defined by the anode 506 and the anode cell sub-unit 518.

As shown in FIG. 7, each oxidant channel 515 may be fluidly coupled to an oxidant circuit 600. The oxidant circuit 600 may include an oxidant inlet 602 having an oxidant inlet manifold 604 that distributes an oxidant to a respective oxidant channel 515 in the fuel cell assembly 502. Additionally, the oxidant circuit 600 may include an oxidant outlet 606 having an outlet manifold 608. Similarly, the fuel channel 534 may be fluidly coupled to a fuel circuit 610. The fuel circuit 610 may include a fuel inlet 612 having a fuel inlet manifold 614 that distributes a fuel to a respective fuel channel 534 in the fuel cell assembly 502. Additionally, the fuel circuit 610 may include a fuel outlet 616 having an outlet manifold 618. Furthermore, each coolant channel 556 may be fluidly coupled to a coolant circuit 620. The coolant circuit 620 may include a coolant inlet 622 having a coolant inlet manifold 624 that distributes an oxidant to a respective coolant channel 556 in the fuel cell assembly 502. Additionally, the coolant circuit 620 may include a coolant outlet 626 having an outlet manifold 628. The fuel and air stream are in similar flow direction to ensure effective operation of the fuel cell. For example, the fuel and air stream may flow in a first flow direction. The coolant flow can either be in counterflow (opposite) direction, co-flow (same) direction, or in cross flow (perpendicular) direction with the fuel and air flow direction. In this way, the coolant flow may flow in a second flow direction that is either the same as the first flow direction or different than the first flow direction. When the coolant flow is in crossflow direction with the fuel and air flows (i.e. coolant flows into/out of the page in FIG. 7), the coolant inlet and outlet manifolds would be perpendicular to the inlet and outlet manifold of the fuel and air stream (not illustrated). The different flow configurations may be used based on requirements for the fuel cell assembly cooling load, compactness, allowable coolant pressure-drop, etc.

As shown by the arrows in FIG. 7 (which indicate flow direction of the fluids in each circuit), oxidants (such as air or other oxidants) may flow through the oxidant channel 515 in a first flow direction. Fuel may flow through the fuel channel 534 in the first flow direction, such that the fuel in the fuel channel 534 and the oxidants in the oxidant channel 515 flow in the same direction (e.g., co-flow). In various embodiments, coolant may flow through the coolant channel 556 in a second flow direction. The second flow direction may be the same or different than the first flow direction. For example, the second flow direction may be one of a countercurrent flow direction (e.g., 180° different than the first flow direction), a co-flow direction (e.g., the same direction as the first flow direction), or cross-flow direction (e.g., 90° different than the first flow direction).

Figure 8:
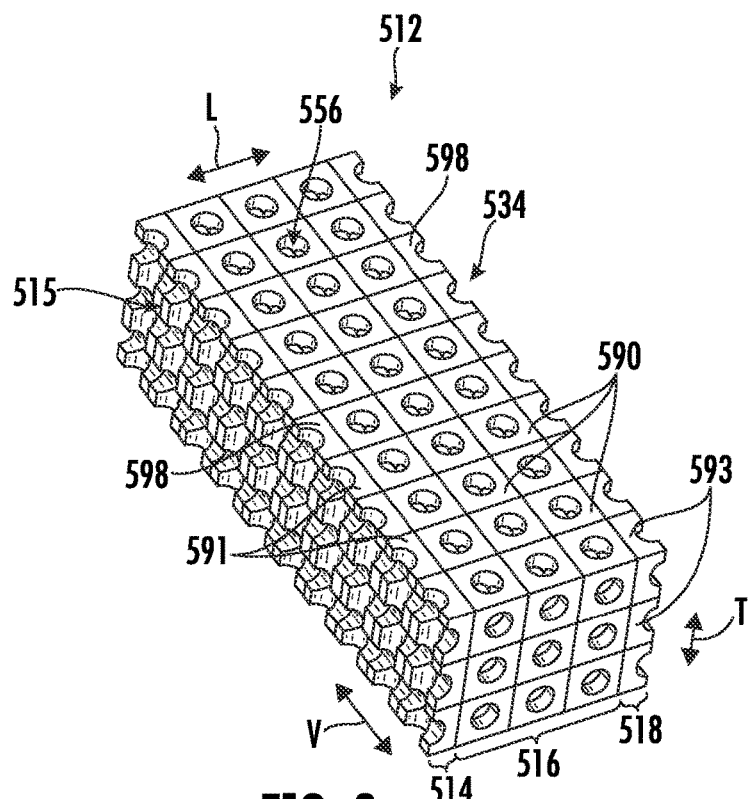
FIG. 8 illustrates a perspective view of a bipolar separator plate in accordance with an exemplary aspect of the present disclosure.
Figure 9:
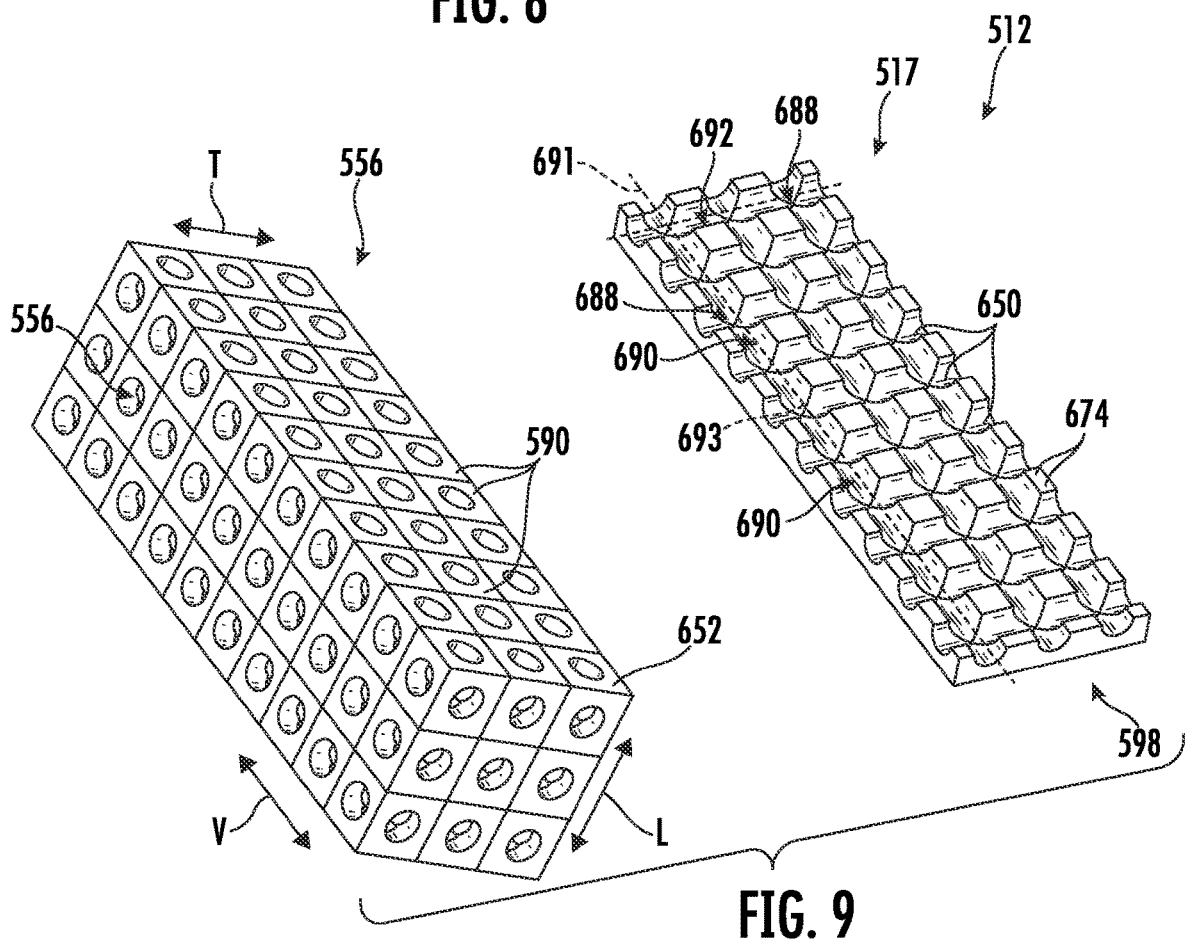
FIG. 9 illustrates a perspective partially exploded view of a bipolar separator plate in accordance with an exemplary aspect of the present disclosure.

Referring now to FIGS. 8 and 9, various aspects of a bipolar separator plate 512 are illustrated in accordance with an embodiment of the present disclosure. For example, FIG. 8 illustrates a perspective view of the bipolar separator plate 512. FIG. 9 illustrates a perspective partially exploded view of the bipolar separator plate 512, in which the coolant cell sub-unit 516 is separated from an electrode cell sub-unit 517. The electrode cell sub-unit 517 may be representative of either (or both) of the anode or cathode cell sub-units 514 or 518 described above.

As shown in FIG. 8, the bipolar separator plate 512 may define a cartesian coordinate system having a vertical direction V, a longitudinal direction L, and a transverse direction T mutually perpendicular to one another. The bipolar separator plate 512 may be stacked with unit-cells vertically, longitudinally, and transversely. For example, the coolant cell sub-unit 516 may include a plurality of rows of unit-cells stacked together along each of the vertical direction V, the longitudinal direction L, and the transverse direction T. In some embodiment, as shown, the cathode cell sub-unit 514 and the anode cell sub-unit 518 may each include a plurality of rows of unit-cells stacked together along each of the vertical direction V and the transverse direction T, but the cathode cell sub-unit 514 and the anode cell sub-unit 518 may each only include a singular row of unit-cells stacked along the longitudinal direction L. In many embodiments, the cathode cell sub-unit 514 and the anode cell sub-unit 518 may each include a solid wall portion 598 that contacts the coolant cell sub-unit 516 to fluidly isolate the one or more channels 515, 534, 556. Particularly, the coolant cell sub-unit 516 may be disposed between the solid wall portion 598 of the cathode cell sub-unit 514 and the solid wall portion 598 of the anode cell sub-unit 518.

As shown in FIG. 9, the electrode cell sub-unit 517 may partially define a channel 688 (which may be either the oxidant channel 515 or the fuel channel 534 described above depending on the electrode that the electrode cell sub-unit 517 is placed in contact with). For example, if the electrode cell sub-unit 517 is positioned in contact with the anode 506, then the anode 506 and the electrode cell sub-unit 517 may collectively define the fuel channel 534. Likewise, if the electrode cell sub-unit 517 is positioned in contact with a cathode 508, then the cathode 508 and the electrode cell sub-unit 517 may collectively define the oxidant channel 515. As shown in FIG. 9, the channel 688 may include vertically extending portions 690 and transversely extending portions 692. For example, each of the vertically extending portions 690 of the channel 688 may extend along a vertical axis 691 without interruption (i.e., no blockages or other impediments) from a top of the electrode cell sub-unit 517 to a bottom of the electrode cell sub-unit 517. Similarly, each of the transversely extending portions 692 may extend along a transverse axis 693 without interruption from a first end to a second end of the electrode cell sub-unit 517.

Figure 10:
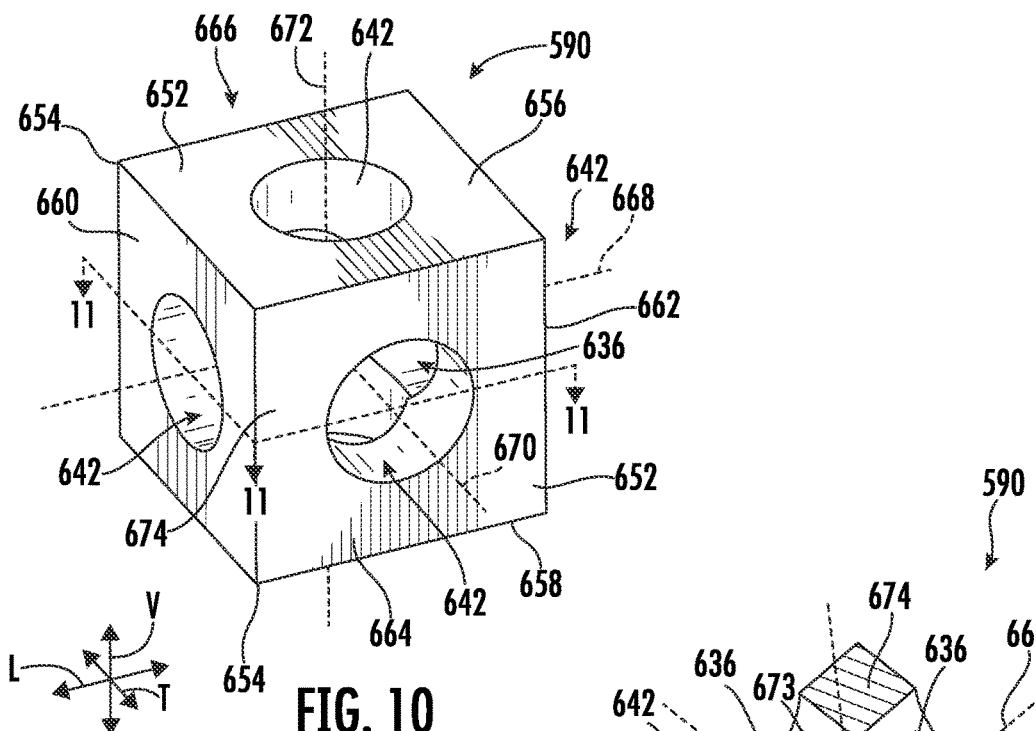
FIG. 10 illustrates a perspective view of a unit-cell of the plurality of unit-cells that collectively make up the coolant cell sub-unit of the bipolar separator plate shown in FIGS. 8 and 9 in accordance with an exemplary aspect of the present disclosure.
Figure 11:
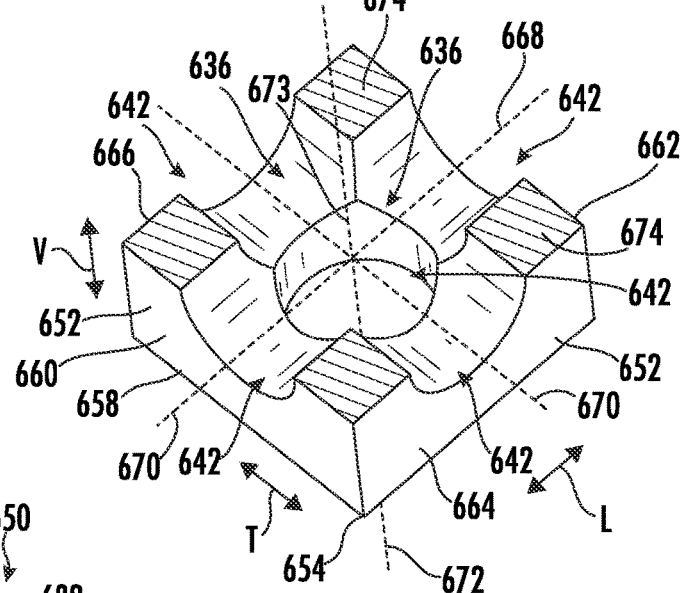
FIG. 11 illustrates a cross-sectional perspective view of the unit-cell shown in FIG. 10 from along the line 11-11 in accordance with an exemplary aspect of the present disclosure.

FIG. 10 illustrates a perspective view of a unit-cell 590 (e.g., a single-fluid unit-cell) in the plurality of unit-cells 590 that collectively make up the coolant cell sub-unit 516 of the bipolar separator plate 512. FIG. 11 illustrates a cross-sectional perspective view of the unit-cell 590 from along the line 11-11 shown in FIG. 10. As shown in FIGS. 10 and 11, the unit-cell 590 may be shaped as a polyhedron having a plurality of side surfaces 652 and a plurality of corners 654 (or vertices) defined at junctions between the plurality of side surfaces 652. In exemplary embodiments, as shown, the unit-cell 590 may be shaped as a cuboid, rectangular prism, or a cube, such that the unit-cell 590 has six side surfaces 652 and eight corners 654. Each side surface 652 may be perpendicular to four other side surfaces 652 and parallel to one other side surface 652. The plurality of side surfaces 652 may include a top side surface 656 and a bottom side surface 658 spaced apart from one another in the vertical direction V. The plurality of side surfaces 652 may further include a first side surface 660 and a second side surface 662 spaced apart from one another in the longitudinal direction L. The plurality of side surfaces 652 may further include a third side surface 664 and a fourth side surface 666 spaced apart from one another in the transverse direction T.

In exemplary embodiments, the unit-cell 590 may define a plurality of openings 642 and an internal volume 636 extending along the longitudinal direction L, the vertical direction V, and the transverse direction T between each of the openings 642 on two opposite side surfaces 652. For example, each opening 642 of the plurality of openings 642 may be defined on a respective side surface 652. Each of the openings 642 may be shaped as a circle; however, in other embodiments, the openings 642 may be shaped as an oval, square, rectangle, or other shapes. Particularly, the openings 642 may each be defined on the center of a respective side surface 652 (e.g., the side surface 652 may be shaped as a square and the opening 642 may be centered on the square).

As shown in FIGS. 10 and 11, each unit-cell 590 may defines a longitudinal centerline 668, a transverse centerline 670, and a vertical centerline 672 each extending through a centroid 673 (e.g., where all the centerlines intersect) of the unit-cell 590 and mutually orthogonal to one another. For example, the longitudinal centerline 668 may extend in the longitudinal direction L through the centroid 673 (i.e., geometric center) of the unit-cell 590, the transverse centerline 670 may extend in the transverse direction T through the centroid 673 of the unit-cell 590, and the vertical centerline 672 may extend in the vertical direction V through the centroid 673 of the unit-cell 590. In exemplary embodiments, as shown, the internal volume 636 may extend along the longitudinal centerline 668, the transverse centerline 670, and the vertical centerline 672 between respective openings 642 of the plurality of openings 642. Particularly, the internal volume 636 may include a cylindrically shaped portion extending along each of the centerlines 668, 670, 672. For example, the internal volume 636 may include a first cylindrically shaped portion that extends along the longitudinal centerline 668 between two openings 642 on opposite side surfaces 652. Further, the internal volume 636 may include a second cylindrically shaped portion that extends along the transverse centerline 670 between two openings 642 on opposite side surfaces 652. Furthermore, the internal volume 636 may include a third cylindrically shaped portion that extends along the vertical centerline 672 between two openings 642 on opposite side surfaces 652.

The unit-cell 590 may define three cylindrically shaped passages that each extend through the centroid 673 of the cell, extend mutually perpendicularly to one another, and collectively define the internal volume 636. For example, as shown in FIGS. 10 and 11, the internal volume 636 may extend along the longitudinal centerline 668 from a first opening defined on the first side surface 660, through a centroid 673 of the unit-cell 590, to a second opening defined on the second side surface 662. Additionally, the internal volume 636 may extend along the transverse centerline 670 from a third opening defined on the third side surface 664, through the centroid 673 of the unit-cell 590, to a fourth opening defined on the fourth side surface 666. Furthermore, the internal volume 636 may extend along the vertical centerline 672 from a fifth opening defined on a bottom side surface 656, through the centroid 673 of the unit-cell, to a sixth opening defined on a top side surface 658.

As shown in FIG. 11, the unit-cell 590 may include a plurality of edge portions 674 each extending between two corners 654 of the plurality of corners 654. As shown in FIG. 11, the edge portions 674 may each have a generally rectangular shaped cross-sectional shape.

Figure 12:
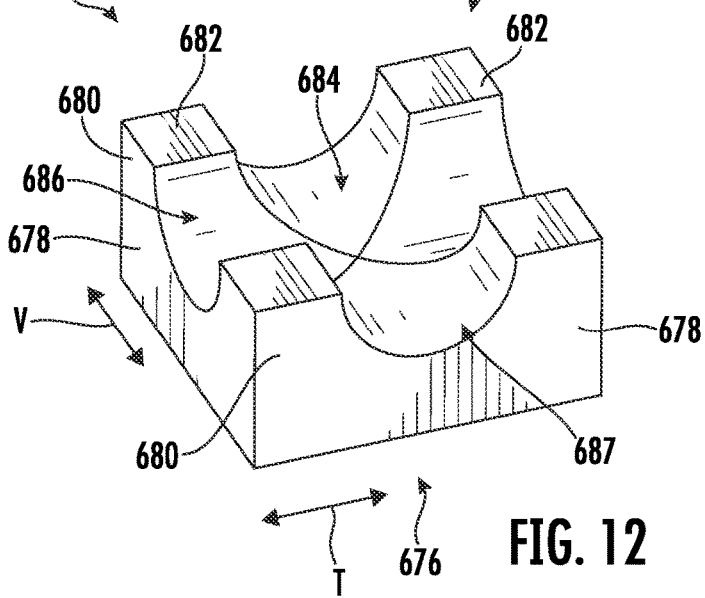
FIG. 12 illustrates a unit-cell of the plurality of unit-cells that collectively make up an electrode cell sub-unit shown in FIG. 9 in accordance with an exemplary aspect of the present disclosure.

FIG. 12 illustrates a unit-cell 650 (e.g., a single-fluid unit cell) from the electrode cell sub-unit 517. The unit-cell 650 may be representative of either or both of the unit-cell 591 or the unit-cell 593 described above, such that the unit-cell 650 may be included in the cathode cell sub-unit 514 and/or the anode cell sub-unit 518. The unit-cell 650 may include a solid side 676 and a plurality of side surfaces 678 each extending perpendicularly from the solid side 676. When implemented in a fuel cell sub-unit, such as the electrode cell sub-unit 517, the solid sides 676 of the unit-cells 650 may collectively define the solid wall portion 598. As used herein "solid side" may include a wall or surface that does not include any openings, voids, or cavities (i.e., the surface is impermeable). When assembled, the solid side 676 of the unit-cell 650 may contact one or more unit-cells 590 in the coolant cell sub-unit 516 to partially define the coolant channel 556. The unit-cell 650 may include four edge portions 680 each extending from the solid side 676 to a free end 682. The free end 682 may have a generally rectangular or square cross-sectional shape. When assembled, each of the free ends 682 may contact (directly contact) an electrode (e.g., the anode 506 or the cathode 508), such that the electrode and the plurality of unit-cells 650 define a channel (i.e., either the fuel channel or the oxidant channel).

Generally, as shown in FIG. 12, the unit-cell 650 may generally be shaped as a rectangular prism and may define an internal volume 684 that includes two semi-cylindrical portions 686, 687. The first semi-cylindrical portion 686 may extend generally vertically from a first semi-circular opening to a second semi-circular opening, and the second semi-cylindrical portion 687 may extend generally transversely from a third semi-circular opening to a fourth semi-circular opening.

Figure 13:
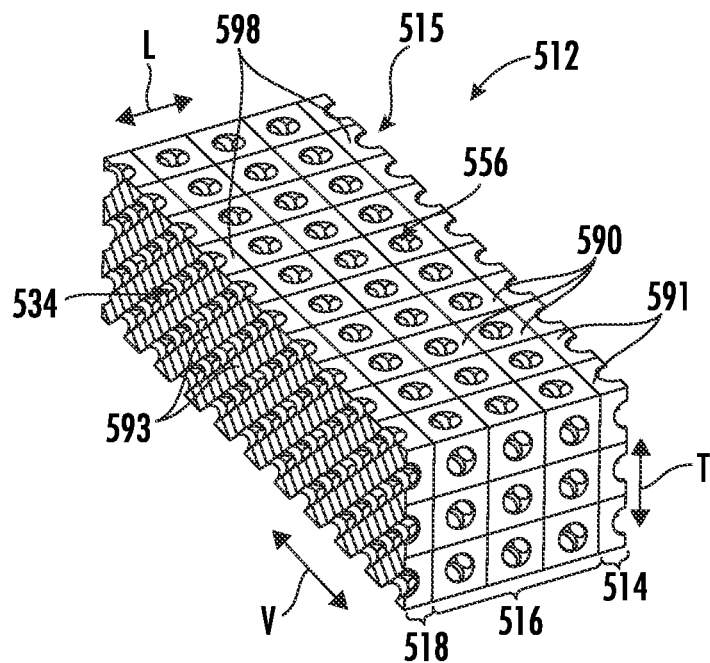
FIG. 13 illustrates a perspective view of a bipolar separator plate in accordance with an exemplary aspect of the present disclosure.
Figure 14:
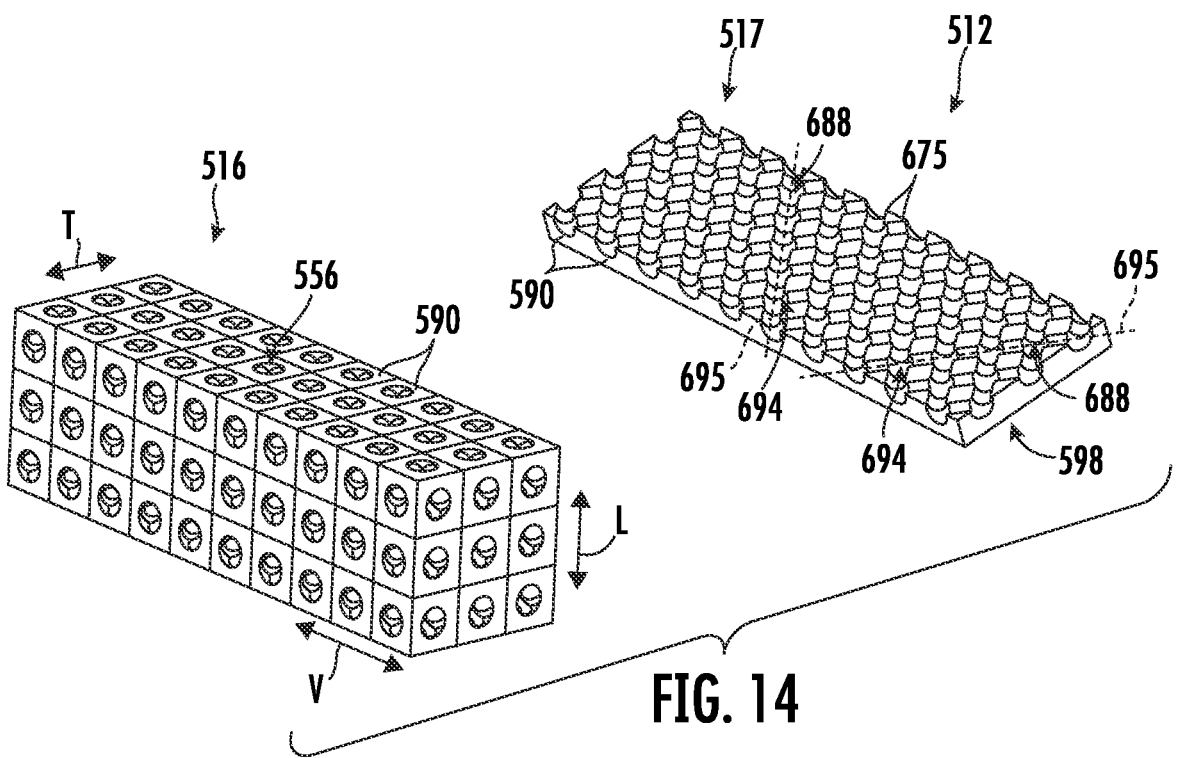
FIG. 14 illustrates a perspective partially exploded view of a bipolar separator plate in accordance with an exemplary aspect of the present disclosure.

Referring now to FIGS. 13 and 14, various aspects of a bipolar separator plate 512 are illustrated in accordance with another embodiment of the present disclosure. For example, FIG. 13 illustrates a perspective view of the bipolar separator plate 512. FIG. 14 illustrates a perspective partially exploded view of the bipolar separator plate 512, in which the coolant cell sub-unit 516 is separated from an electrode cell sub-unit 517. The electrode cell sub-unit 517 may be representative of either (or both) of the anode or cathode cell sub-units 514 or 518 described above.

As shown in FIG. 14, the electrode cell sub-unit 517 may partially define a channel 688 (which may be either the oxidant channel 515 or the fuel channel 534 described above depending on the electrode that the electrode cell sub-unit 517 is placed in contact with). For example, if the electrode cell sub-unit 517 is positioned in contact with the anode 506, then the anode 506 and the electrode cell sub-unit 517 may collectively define the fuel channel 534. Likewise, if the electrode cell sub-unit 517 is positioned in contact with a cathode 508, then the cathode 508 and the electrode cell sub-unit 517 may collectively define the oxidant channel 515. As shown in FIG. 14, the channel 688 may include a plurality of oblique extending portions 694. Each of the oblique extending portions 694 may extend generally oblique to both the vertical direction V and the transverse direction T. For example, each of the oblique extending portions 694 of the channel 688 of the electrode cell sub-unit 517 may extend without interruption along an oblique axis 695.

FIG. 15 illustrates a perspective view of a unit-cell 590 (e.g., a single-fluid unit-cell) in the plurality of unit-cells 590 that collectively make up the coolant cell sub-unit 516 of the bipolar separator plate 512. FIG. 16 illustrates a cross-sectional perspective view of the unit-cell 590 from FIG. 15 along the line 16-16. As shown in FIGS. 15 and 16, the unit-cell 590 may be shaped as a polyhedron having a plurality of side surfaces 652 and a plurality of corners 654 (or vertices) defined at junctions between the plurality of side surfaces 652. In exemplary embodiments, as shown, the unit-cell 590 may be shaped as a cuboid, rectangular prism, or a cube, such that the unit-cell 590 has six side surfaces 652 and eight corners 654. Each side surface 652 may be perpendicular to four other side surfaces 652 and parallel to one other side surface 652. The plurality of side surfaces 652 may include a top side surface 656 and a bottom side surface 658 spaced apart from one another in the vertical direction V. The plurality of side surfaces 652 may further include a first side surface 660 and a second side surface 662 spaced apart from one another in the longitudinal direction L. The plurality of side surfaces 652 may further include a third side surface 664 and a fourth side surface 666 spaced apart from one another in the transverse direction T.

In exemplary embodiments, the unit-cell 590 may define a plurality of openings 642 and an internal volume 636 extending in a plurality of directions between each of the openings 642 on two adjacent side surfaces 652. For example, each opening 642 of the plurality of openings 642 may be defined on a respective side surface 652. Each of the openings 642 may be shaped as a circle; however, in other embodiments, the openings 642 may be shaped as an oval, square, rectangle, or other shapes. Particularly, the openings 642 may each be defined on the center of a respective side surface 652 (e.g., the side surface 652 may be shaped as a square and the opening 642 may be centered on the square).

As shown in FIGS. 15 and 16, each unit-cell 590 may defines a longitudinal centerline 668, a transverse centerline 670, and a vertical centerline 672 each extending through a centroid 673 (e.g., where all the centerlines intersect) of the unit-cell 590 and mutually orthogonal to one another. For example, the longitudinal centerline 668 may extend in the longitudinal direction L through the centroid 673 (i.e., geometric center) of the unit-cell 590, the transverse centerline 670 may extend in the transverse direction T through the centroid 673 of the unit-cell 590, and the vertical centerline 672 may extend in the vertical direction V through the centroid 673 of the unit-cell 590. In exemplary embodiments, as shown, the internal volume 636 may extend at least partially along the longitudinal centerline 668, the transverse centerline 670, and the vertical centerline 672 between respective openings 642 of the plurality of openings 642 without extending through the centroid 673 of the unit-cell 590.

As shown in FIG. 16, the unit-cell 590 may include a plurality of edge portions 675 each extending between two corners 654 of the plurality of corners 654. As shown in FIG. 16, the edge portions 675 may each have a triangular shaped cross-sectional shape.

Additionally, as shown in FIG. 16 the centroid 673 of the unit-cell 590 may be solid and partially define the internal volume 636. For example, the centroid 673 of the unit-cell 590 may be disposed on a solid center portion 696. The solid center portion 696 may have a generally rectangular or square shaped cross-section. In many embodiments, as shown in FIG. 16, the internal volume 636 may further include a plurality of cylindrically shaped portions 698. Each of the cylindrically shaped portions 698 may extend generally oblique to each of the vertical direction V, the longitudinal direction L, and the transverse direction T of the unit-cell 590. For example, each of the cylindrically shaped portions 698 may extend between the solid center portion 696 and the edge portion 675. Particularly, as shown in FIG. 16, each of the cylindrically shaped portions 698 may extend between a straight edge of the solid center portion 696 and a hypotenuse of the edge portion 675.

FIG. 17 illustrates a unit-cell 650 (e.g., a single-fluid unit-cell) from the electrode cell sub-unit 517. The unit-cell 650 may be representative of either or both of the unit-cell 591 or the unit-cell 593 described above, such that the unit-cell 650 may be included in the cathode cell sub-unit 514 and/or the anode cell sub-unit 518. The unit-cell 650 may include a solid side 676 and a plurality of side surfaces 678 each extending perpendicularly from the solid side 676. As used herein "solid side" may include a wall or surface that does not include any openings, voids, or cavities (i.e., the surface is impermeable). When assembled, the solid side 676 of the unit-cell 650 may contact one or more unit-cells 590 in the coolant cell sub-unit 516 to partially define the coolant channel 556. The unit-cell 650 may include four edge portions 681 each extending from the solid side 676 to a free end 683. The free end 683 may have a generally triangular cross-sectional shape. When assembled, each of the free ends 683 may contact (directly contact) an electrode (e.g., the anode 506 or the cathode 508), such that the electrode and the plurality of unit-cells 650 define a channel (i.e., either the fuel channel or the oxidant channel).

As shown in FIG. 17, the unit-cell 650 may generally be shaped as a rectangular prism and may define an internal volume 685 that includes four semi-cylindrical portions 700 each extending between opening portions 702. The unit-cell may include a solid center portion 685 shaped as a rectangular prism (e.g., a square) having four sides and four corners. Each of the opening portions 702 may be defined between two edge portions 681 and a corner of the solid center portion 685, and each of the semi-cylindrical portions 700 may extend between two opening portions 702 oblique to each of the vertical direction V and the longitudinal direction L. For example, each of the semi-cylindrical portions 700 may be defined by a side of the solid center portion 685 and a hypotenuse side of an edge portion 681.

Figure 18:
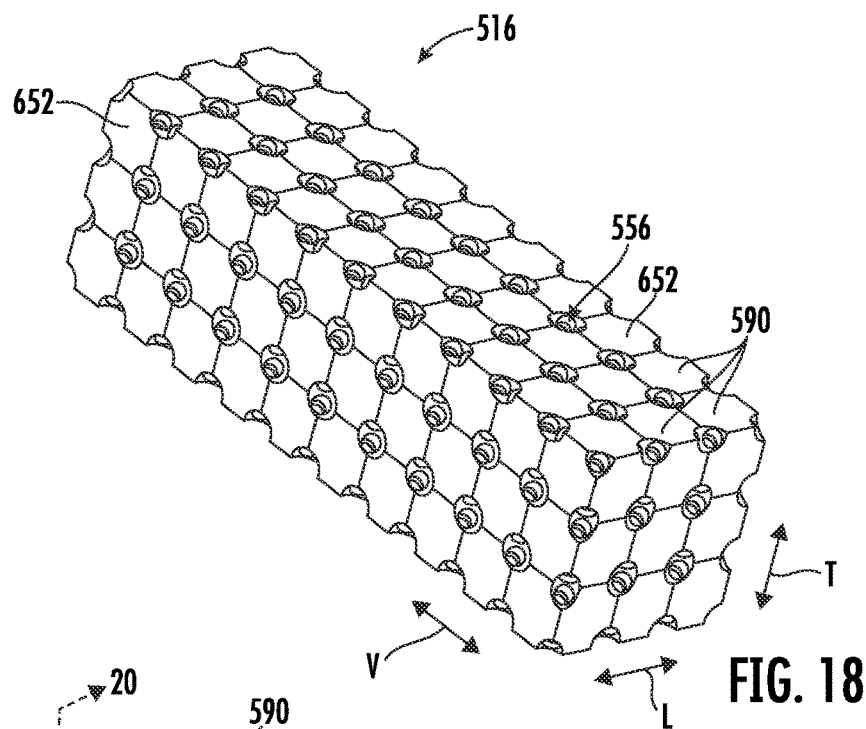
FIG. 18 illustrates a perspective view of a coolant cell sub-unit of a bipolar separator plate in accordance with an exemplary aspect of the present disclosure.
Figure 19:
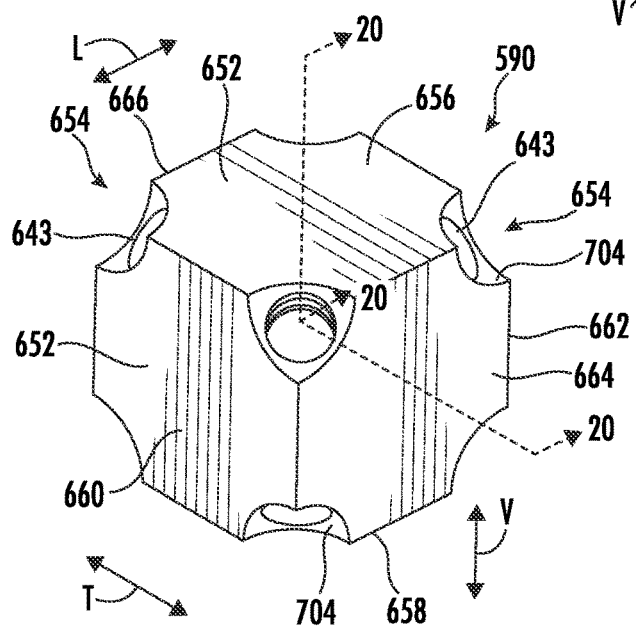
FIG. 19 illustrates a perspective view of a unit-cell of the plurality of unit-cells that collectively make up the coolant cell sub-unit of the bipolar separator plate shown in FIG. 18.
Figure 20:
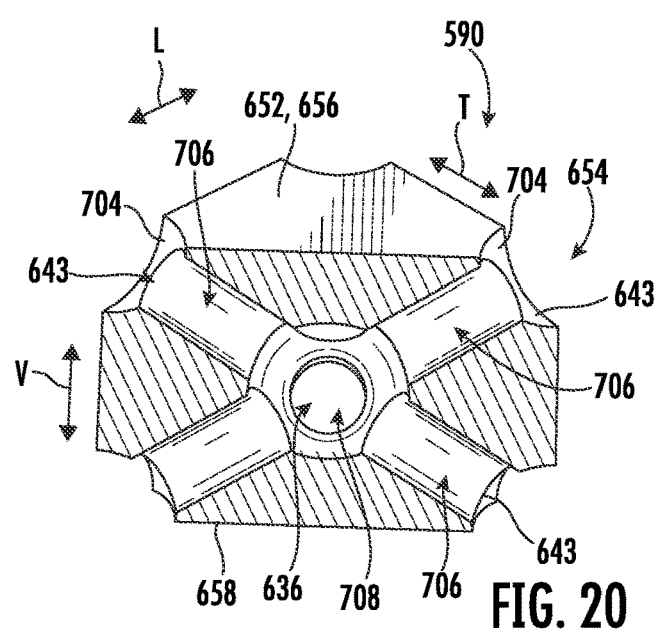
FIG. 20 illustrates a cross-sectional perspective view of the unit-cell from FIG. 19 from along the diagonal section line 20-20 shown in FIG. 19.

Referring now to FIGS. 18 through 20, various aspects of a bipolar separator plate 512 is illustrated in accordance with another embodiment of the present disclosure. For example, FIG. 18 illustrates a perspective view of a coolant cell sub-unit 516 of a bipolar separator plate 512. FIG. 19 illustrates a perspective view of a unit-cell 590 (e.g., a single-fluid unit-cell) in the plurality of unit-cells 590 that collectively make up the coolant cell sub-unit 516 of the bipolar separator plate 512. FIG. 20 illustrates a cross-sectional perspective view of the unit-cell 590 from FIG. 19 from along the diagonal section line 20-20 shown in FIG. 19.

As shown in FIGS. 18 through 20, the unit-cell 590 may be shaped as a polyhedron having a plurality of side surfaces 652 and a plurality of corners 654 (or vertices) defined at junctions between the plurality of side surfaces 652. In exemplary embodiments, as shown, the unit-cell 590 may be shaped as a cuboid, rectangular prism, or a cube, such that the unit-cell 590 has six side surfaces 652 and eight corners 654. Each side surface 652 may be perpendicular to four other side surfaces 652 and parallel to one other side surface 652. The plurality of side surfaces 652 may include a top side surface 656 and a bottom side surface 658 spaced apart from one another in the vertical direction V. The plurality of side surfaces 652 may further include a first side surface 660 and a second side surface 662 spaced apart from one another in the longitudinal direction L. The plurality of side surfaces 652 may further include a third side surface 664 and a fourth side surface 666 spaced apart from one another in the transverse direction T.

In exemplary embodiments, the unit-cell 590 may define a plurality of openings 643 and an internal volume 636 extending in a plurality of directions between each of the openings 643. For example, each opening 643 of the plurality of openings 643 may be defined on a respective corner 654. Each of the openings 643 may be shaped as a circle; however, in other embodiments, the openings 642 may be shaped as an oval, square, rectangle, or other shapes. In exemplary embodiments, as shown, the at least one corner 654 of the plurality of corners 654 may define a chamfered end 704 that forms part of a sphere. In such embodiments, as shown, each of the openings 643 may be disposed on a respective chamfered end 704 (e.g., centered on the chamfered end). The chamfered end may form $1/8^{th}$ of sphere, such that when eight unit-cells are disposed adjacent to one another, the eight chamfered ends may collectively define an entire sphere. Alternatively stated, when four unit-cells are disposed adjacent to one another (as shown in FIG. 18), the four chamfered ends may collectively define a half sphere.

As shown in FIG. 20, the internal volume 636 may include a plurality of cylindrically shaped portions 706 each extending between diagonally opposite corners 654 (e.g., diametrically opposed corners 654). of the plurality of corners 654. For example, each of the cylindrically shaped portions 706 may extend diagonally (or oblique) to the vertical direction V, the longitudinal direction L, and the transverse direction between a first corner and a second corner opposite the first corner. Each of the cylindrically shaped portions 706 may extend through the centroid of the unit-cell 590. Particularly, the internal volume 636 may further include a spherical center 708, and each of the cylindrically shaped portions 706 may extend from a respective corner 654 to the spherical center 708 of the internal volume 636.

Further aspects are provided by the subject matter of the following clauses:

A fuel cell assembly comprising: a plurality of fuel cells; and a bipolar separator plate disposed between each fuel cell of the plurality of fuel cells, the bipolar separator plate comprising: one or more fuel cell sub-units each comprising a plurality of unit-cells, each unit-cell in the plurality of unit-cells having an outer surface and defining an internal volume that extends in multiple directions between a plurality of openings defined on the outer surface, and wherein each unit-cell in the plurality of unit-cells is disposed adjacent to a neighboring unit-cell in the plurality of unit-cells such that the plurality of unit-cells collectively define one or more channels.

The fuel cell assembly as in one or more of these clauses, wherein at least one opening of the plurality of openings of each unit-cell in the plurality of unit-cells aligns with a neighboring opening of the plurality of openings in the neighboring unit-cell of the plurality of unit-cells such that the internal volume of each unit-cell of the plurality of unit-cells collectively define the one or more channels.

The fuel cell assembly as in one or more of these clauses, wherein the one or more channels comprises an oxidant channel defined in a cathode cell sub-unit of the one or more fuel cell sub-units, a coolant channel defined in a coolant cell sub-unit of the one or more fuel cell sub-units, and a fuel channel defined in an anode cell sub-unit of the one or more fuel cell sub-units, and wherein the oxidant channel, the coolant channel, and the fuel channel are fluidly isolated from one another.

The fuel cell assembly as in one or more of these clauses, wherein each fuel cell of the plurality of fuel cells comprises an anode, a cathode, and a solid electrolyte disposed between the anode and the cathode, wherein the oxidant channel is at least partially defined by the cathode of a first fuel cell in the plurality of fuel cells, and wherein the fuel channel is at least partially defined by the anode of a second fuel cell in the plurality of fuel cells.

The fuel cell assembly as in one or more of these clauses, wherein each unit-cell of the plurality of unit-cells is shaped as a polyhedron having a plurality of side surfaces and a plurality of corners defined at junctions between the plurality of side surfaces.

The fuel cell assembly as in one or more of these clauses, wherein each opening of the plurality of openings is defined on a respective side surface.

The fuel cell assembly as in one or more of these clauses, wherein each unit-cell of the plurality of unit-cells defines a longitudinal centerline, a transverse centerline, and a vertical centerline each extending through a centroid of the unit-cell and mutually orthogonal to one another, and wherein the internal volume extends along the longitudinal centerline, the transverse centerline, and the vertical centerline between each of the openings on two opposite side surfaces.

The fuel cell assembly as in one or more of these clauses, wherein the internal volume extends between each of the openings on adjacent side surfaces.

The fuel cell assembly as in one or more of these clauses, wherein each opening of the plurality of openings is defined on a corner of the plurality of corners and wherein the internal volume includes a plurality of cylindrically shaped portions each extending between diagonally opposite corners of the plurality of corners and wherein at least one corner of the plurality of corners defines a chamfered end forming part of a sphere.

The fuel cell assembly as in one or more of these clauses, wherein the oxidant channel is fluidly coupled to an oxidant inlet manifold and an oxidant outlet manifold, the fuel channel is fluidly coupled to a fuel inlet manifold and a fuel outlet manifold, and the coolant channel is fluidly coupled to a coolant inlet manifold and a coolant outlet manifold.

The fuel cell assembly as in one or more of these clauses, wherein oxidants flow through the oxidant channel in a first flow direction, wherein fuel flows through the fuel channel in the first flow direction, and wherein coolant flows through the coolant channel in a second flow direction, and wherein the second flow direction is one of the same or different than the first flow direction.

The fuel cell assembly as in one or more of these clauses, wherein a centroid of each unit-cell of the plurality of unit-cells is solid and partially defines the internal volume and wherein the internal volume comprises a plurality of cylindrically shaped portions.

A propulsion system comprising: a turbomachine comprising a compressor section and a combustion section; and a fuel cell assembly comprising: a plurality of fuel cells; and a bipolar separator plate disposed between each fuel cell of the plurality of fuel cells, the bipolar separator plate including a cathode cell sub-unit that defines an oxidant channel fluidly coupled to the compressor section, a coolant cell sub-unit that defines a coolant channel, and an anode cell sub-unit that defines a fuel channel fluidly coupled to the combustion section, wherein the oxidant channel, the coolant channel, and the fuel channel are fluidly isolated from one another.

The propulsion system as in one or more of these clauses, wherein the oxidant channel is at least partially defined by the cathode of a first fuel cell in the plurality of fuel cells, and wherein the fuel channel is at least partially defined by the anode of a second fuel cell in the plurality of fuel cells.

The propulsion system as in one or more of these clauses, wherein the oxidant channel comprises an oxidant inlet and an oxidant outlet, wherein the oxidant inlet is fluidly coupled to a low pressure compressor stage of the compressor section via a bleed air line, and wherein the oxidant outlet is fluidly coupled to one of a high pressure compressor stage of the compressor section via a cathode exhaust line or the combustion section.

The propulsion system as in one or more of these clauses, wherein the fuel channel comprises a fuel inlet and one or more outlets, wherein the fuel inlet fluidly is fluidly coupled a fuel supply line, and wherein the one or more outlets of the fuel channel is fluidly coupled to one of the combustion section or one or more turbine stage in the turbine section.

The propulsion system as in one or more of these clauses, wherein an air-to-air heat exchanger thermally couples the bleed air line and the cathode exhaust line, and wherein a fuel-to-fuel heat exchanger thermally couples the fuel supply line and the one or more fuel channel outlets.

The propulsion system as in one or more of these clauses, wherein the coolant channel is in fluid communication with a heat-sink heat exchanger in a closed cycle loop.

The propulsion system as in one or more of these clauses, wherein each fuel cell of the plurality of fuel cells comprises an anode, a cathode, and a solid electrolyte disposed between the anode and the cathode, wherein the oxidant channel is at least partially defined by the cathode of a first fuel cell in the plurality of fuel cells, and wherein the fuel channel is at least partially defined by the anode of a second fuel cell in the plurality of fuel cells.

The propulsion system as in one or more of these clauses, wherein the bipolar separator plate further comprises a plurality of unit-cells each having an outer surface, each unit-cell of the plurality of unit-cells defining an internal volume that extends in multiple directions between a plurality of openings defined on the outer surface, wherein each unit-cell in the plurality of unit-cells is disposed adjacent to a neighboring unit-cell in the plurality of unit-cells such that the plurality of unit-cells collectively define one or more channels, and wherein the one or more channels comprises the oxidant channel, the coolant channel, and the fuel channel.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A fuel cell assembly comprising:
    a plurality of fuel cells; and
    a bipolar separator plate disposed between each fuel cell of the plurality of fuel cells, the bipolar separator plate comprising:
        one or more fuel cell sub-units each comprising a plurality of unit-cells, each unit-cell in the plurality of unit-cells having an outer surface and defining an internal volume that extends in a plurality of directions between a plurality of openings defined on the outer surface, and wherein each unit-cell in the plurality of unit-cells is disposed adjacent to a neighboring unit-cell in the plurality of unit-cells such that the plurality of unit-cells collectively define one or more channels.

2. The fuel cell assembly as in claim 1, wherein at least one opening of the plurality of openings of each unit-cell in the plurality of unit-cells aligns with a neighboring opening of the plurality of openings in the neighboring unit-cell of the plurality of unit-cells such that the internal volume of each unit-cell of the plurality of unit-cells collectively define the one or more channels.

3. The fuel cell assembly as in claim 1, wherein the one or more channels comprises an oxidant channel defined in a cathode cell sub-unit of the one or more fuel cell sub-units, a coolant channel defined in a coolant cell sub-unit of the one or more fuel cell sub-units, and a fuel channel defined in an anode cell sub-unit of the one or more fuel cell sub-units, and wherein the oxidant channel, the coolant channel, and the fuel channel are fluidly isolated from one another.

4. The fuel cell assembly as in claim 3, wherein each fuel cell of the plurality of fuel cells comprises an anode, a cathode, and a solid electrolyte disposed between the anode and the cathode, wherein the oxidant channel is at least partially defined by the cathode of a first fuel cell in the plurality of fuel cells, and wherein the fuel channel is at least partially defined by the anode of a second fuel cell in the plurality of fuel cells.

5. The fuel cell assembly as in claim 4, wherein the oxidant channel is fluidly coupled to an oxidant inlet manifold and an oxidant outlet manifold, the fuel channel is fluidly coupled to a fuel inlet manifold and a fuel outlet manifold, and the coolant channel is fluidly coupled to a coolant inlet manifold and a coolant outlet manifold.

6. The fuel cell assembly as in claim 5, wherein oxidants flow through the oxidant channel in a first flow direction, wherein fuel flows through the fuel channel in the first flow direction, and wherein coolant flows through the coolant channel in a second flow direction, and wherein the second flow direction is one of the same or different than the first flow direction.

7. The fuel cell assembly as in claim 1, wherein each unit-cell of the plurality of unit-cells is shaped as a polyhedron having a plurality of side surfaces and a plurality of corners defined at junctions between the plurality of side surfaces.

8. The fuel cell assembly as in claim 7, wherein each opening of the plurality of openings is defined on a respective side surface.

9. The fuel cell assembly as in claim 8, wherein each unit-cell of the plurality of unit-cells defines a longitudinal centerline, a transverse centerline, and a vertical centerline each extending through a centroid of the unit-cell and mutually orthogonal to one another, and wherein the internal volume extends along the longitudinal centerline, the transverse centerline, and the vertical centerline between each of the plurality of openings on two opposite side surfaces.

10. The fuel cell assembly as in claim 8, wherein the internal volume extends between each of the plurality of openings on adjacent side surfaces.

11. The fuel cell assembly as in claim 7, wherein each opening of the plurality of openings is defined on a corner of the plurality of corners and wherein the internal volume includes a plurality of cylindrically shaped portions each extending between diagonally opposite corners of the plurality of corners and wherein at least one corner of the plurality of corners defines a chamfered end forming part of a sphere.

12. The fuel cell assembly as in claim 1, wherein a centroid of each unit-cell of the plurality of unit-cells is solid and partially defines the internal volume and wherein the internal volume comprises a plurality of cylindrically shaped portions.

* * * * *